US010407338B2

(12) United States Patent
Aitken et al.

(10) Patent No.: US 10,407,338 B2
(45) Date of Patent: *Sep. 10, 2019

(54) PHOTOVOLTAIC MODULE PACKAGE

(71) Applicant: CORNING INCORPORATED, Corning, NY (US)

(72) Inventors: Bruce Gardiner Aitken, Corning, NY (US); Adam James Ellison, Corning, NY (US); James Patrick Hamilton, Horseheads, NY (US); Timothy James Kiczenski, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/616,113

(22) Filed: Jun. 7, 2017

(65) Prior Publication Data

US 2017/0267573 A1 Sep. 21, 2017

Related U.S. Application Data

(63) Continuation of application No. 14/260,625, filed on Apr. 24, 2014, now Pat. No. 9,701,567.

(60) Provisional application No. 61/817,052, filed on Apr. 29, 2013.

(51) Int. Cl.
*C03C 3/085* (2006.01)
*C03C 3/087* (2006.01)
*C03C 3/091* (2006.01)

(52) U.S. Cl.
CPC .............. *C03C 3/091* (2013.01); *C03C 3/085* (2013.01); *C03C 3/087* (2013.01)

(58) Field of Classification Search
CPC ......... C03C 3/083; C03C 3/085; C03C 3/087; C03C 3/091
See application file for complete search history.

(56) References Cited

U.S. PATENT DOCUMENTS

| 1,968,823 | A | 8/1934 | Gaides et al. |
| 3,338,696 | A | 8/1967 | Dockerty |
| 3,682,609 | A | 8/1972 | Dockerty |
| 4,298,389 | A | 11/1981 | Johnson et al. |
| 4,455,383 | A | 6/1984 | Panzera |
| 4,734,388 | A | 3/1988 | Cameron et al. |
| 4,737,388 | A | 3/1988 | Cameron et al. |
| 5,631,195 | A | 5/1997 | Yanagisawa et al. |
| 5,780,373 | A | 7/1998 | Yanagisawa et al. |
| 5,785,726 | A | 7/1998 | Dorfeld et al. |
| 5,824,127 | A | 10/1998 | Bange et al. |
| 5,854,153 | A | 12/1998 | Kohli |
| 5,858,897 | A | 1/1999 | Maeda et al. |
| 5,895,719 | A | 4/1999 | Fyles et al. |
| 5,908,794 | A | 6/1999 | Maeda et al. |
| 5,925,583 | A | 7/1999 | Yoshii et al. |
| 5,932,503 | A | 8/1999 | Kim et al. |
| 5,994,642 | A | 11/1999 | Higuchi et al. |
| 6,017,838 | A | 1/2000 | Marlor |
| 6,054,401 | A | 4/2000 | Sugiura et al. |
| 6,063,718 | A | 5/2000 | El Khiati et al. |
| 6,087,284 | A | 7/2000 | Brix et al. |
| 6,128,924 | A | 10/2000 | Bange et al. |
| 6,207,603 | B1 | 3/2001 | Danielson et al. |
| 6,251,812 | B1 | 6/2001 | Koyama et al. |
| 6,268,304 | B1 | 7/2001 | Maeda et al. |
| 6,297,182 | B1 | 10/2001 | Maeda et al. |
| 6,313,052 | B1 | 11/2001 | Nakashima et al. |
| 6,319,867 | B1 | 11/2001 | Chacon et al. |
| 6,365,534 | B1 | 4/2002 | Koyama et al. |
| 6,417,124 | B1 | 7/2002 | Peuchert et al. |
| 6,461,736 | B1 | 10/2002 | Nagashima et al. |
| 6,465,381 | B1 | 10/2002 | Lautenschlager et al. |
| 6,532,770 | B2 | 3/2003 | Uhlik et al. |
| 6,559,372 | B2 | 5/2003 | Stanbery |
| 6,680,266 | B1 | 1/2004 | Peuchert et al. |
| 6,707,526 | B2 | 3/2004 | Peuchert et al. |
| 6,713,418 | B2 | 3/2004 | Kishimoto et al. |
| 6,753,279 | B2 | 6/2004 | Kohli |
| RE38,959 | E | 1/2006 | Kohli |
| 6,992,030 | B2 | 1/2006 | Paulson |
| 7,087,541 | B2 | 8/2006 | Kohli |
| 7,153,797 | B2 | 12/2006 | Peuchert |
| 7,273,668 | B2 | 9/2007 | Kurachi et al. |
| 7,470,999 | B2 | 12/2008 | Saito et al. |

(Continued)

FOREIGN PATENT DOCUMENTS

| CN | 101428966 | 5/2009 |
| CN | 102617034 A | 8/2012 |

(Continued)

OTHER PUBLICATIONS

Contreras et al; "On the role of NA and modifications to CIGS absorber materials using thin MF (M=Na, K, Cs) precursor layers"; Conference Record of the Twenty Sixth IEEE Photovoltaic Specialist Conference, 1997, 5 pages.
Árd* et al; "Growth of Cu(In,Ga)Se2 thin films by coevaporation using alkaline precursors"; 2000, Thin Sold Films, vol. 361-362, pp. 9-16.
English Translation of JP2016510773 Notice of Grounds for Rejection dated Oct. 4, 2016; 5 Pagesl Japanese Patent Office.
JP2017187741 Office Action dated Dec. 19, 2018, Japan Patent Office.

*Primary Examiner* — Elizabeth A. Bolden

(74) *Attorney, Agent, or Firm* — Svetlana Z. Short

(57) ABSTRACT

Fusion-formable sodium-containing aluminosilicate and boroaluminosilicate glasses are described. The glasses are particularly useful for controlled release of sodium—useful in semiconductor applications, such as thin film photovoltaics where the sodium required to optimize cell efficiency is to be derived from the substrate glass.

17 Claims, No Drawings

(56) References Cited

U.S. PATENT DOCUMENTS

| | | |
|---|---|---|
| 7,666,511 B2 | 2/2010 | Ellison et al. |
| 7,670,975 B2 | 3/2010 | Suzuki et al. |
| 7,696,113 B2 | 4/2010 | Ellison |
| 7,767,607 B2 | 8/2010 | Kurachi et al. |
| 7,863,515 B2 | 1/2011 | Ahn et al. |
| 8,007,913 B2 | 8/2011 | Coppola et al. |
| 8,168,295 B2 | 5/2012 | Murata |
| 8,445,394 B2 | 5/2013 | Aitken et al. |
| 8,647,995 B2 | 2/2014 | Aitken et al. |
| 9,701,567 B2 * | 7/2017 | Aitken .................... C03C 3/091 |
| 2003/0087746 A1 | 5/2003 | Ritter et al. |
| 2003/0109370 A1 | 6/2003 | Ikenishi et al. |
| 2004/0242396 A1 | 10/2004 | Bocko et al. |
| 2005/0284518 A1 | 12/2005 | Yamada et al. |
| 2006/0063009 A1 | 3/2006 | Naitou et al. |
| 2006/0096635 A1 | 5/2006 | Tuttle |
| 2006/0242996 A1 | 11/2006 | Deangelis et al. |
| 2007/0193623 A1 | 8/2007 | Krasnov |
| 2008/0206494 A1 | 8/2008 | Kurachi et al. |
| 2008/0286548 A1 | 11/2008 | Ellison et al. |
| 2008/0308146 A1 | 12/2008 | Krasnov et al. |
| 2009/0197088 A1 | 8/2009 | Murata |
| 2009/0215607 A1 | 8/2009 | Dejneka et al. |
| 2009/0220761 A1 | 9/2009 | Dejneka et al. |
| 2009/0275462 A1 | 11/2009 | Murata |
| 2009/0325775 A1 | 12/2009 | Yeh |
| 2009/0325776 A1 | 12/2009 | Murata |
| 2010/0087307 A1 | 4/2010 | Murata et al. |
| 2010/0212742 A1 | 8/2010 | Engel et al. |
| 2010/0255350 A1 | 10/2010 | Endo et al. |
| 2010/0288351 A1 | 11/2010 | Speit et al. |
| 2010/0300535 A1 | 12/2010 | Aitken et al. |
| 2011/0014475 A1 | 1/2011 | Murata |
| 2011/0030053 A1 | 2/2011 | Lin et al. |
| 2011/0045961 A1 | 2/2011 | Dejneka et al. |
| 2011/0094584 A1 | 4/2011 | Sawada et al. |
| 2011/0203645 A1 | 8/2011 | Kuroki et al. |
| 2011/0265863 A1 | 11/2011 | Nagashima et al. |
| 2012/0199203 A1 | 8/2012 | Nishizawa et al. |
| 2012/0297829 A1 | 11/2012 | Endo et al. |
| 2013/0011650 A1 | 1/2013 | Akiba et al. |
| 2013/0017380 A1 | 1/2013 | Murata et al. |
| 2013/0087187 A1 | 4/2013 | Mitsui et al. |
| 2013/0093312 A1 | 4/2013 | Ono et al. |
| 2013/0101764 A1 | 4/2013 | Schaut et al. |

FOREIGN PATENT DOCUMENTS

| | | |
|---|---|---|
| DE | 10141666 | 3/2003 |
| EP | 0131399 | 6/1984 |
| EP | 1826187 | 8/2007 |
| JP | 58204839 | 11/1983 |
| JP | 62187141 | 8/1987 |
| JP | 09-12332 | 1/1997 |
| JP | 09036400 | 2/1997 |
| JP | 09301732 | 11/1997 |
| JP | 2743333 | 2/1998 |
| JP | 11135819 | 5/1999 |
| JP | 11180727 | 7/1999 |
| JP | 11180728 | 7/1999 |
| JP | 11310433 | 11/1999 |
| JP | 11335133 | 12/1999 |
| JP | 2000128572 | 5/2000 |
| JP | 2000203871 | 7/2000 |
| JP | 2001226137 | 8/2001 |
| JP | 2002003241 | 1/2002 |
| JP | 2002025762 | 1/2002 |
| JP | 2002053340 | 2/2002 |
| JP | 2002175844 | 6/2002 |
| JP | 2003040643 | 2/2003 |
| JP | 2003261352 | 9/2003 |
| JP | 2004131314 | 4/2004 |
| JP | 2004244257 | 9/2004 |
| JP | 2006137631 | 6/2006 |
| JP | 2007287926 | 11/2007 |
| JP | 2008069021 | 3/2008 |
| JP | 2008280189 | 11/2008 |
| JP | 2008308343 | 12/2008 |
| JP | 2009084075 | 4/2009 |
| JP | 2009123962 | 6/2009 |
| JP | 2001226137 | 8/2011 |
| JP | 2013063910 A | 4/2013 |
| WO | 2008028599 | 3/2008 |

* cited by examiner

PHOTOVOLTAIC MODULE PACKAGE

CROSS REFERENCES TO RELATED APPLICATIONS

This application is a continuation of U.S. application Ser. No. 14/260,625, filed on Apr. 24, 2014, which claims the benefit of priority under 35 U.S.C. § 119 of U.S. Provisional Application Ser. No. 61/817,052 filed on Apr. 29, 2013 the content of which is relied upon and incorporated herein by reference in its entirety.

BACKGROUND

Field

Embodiments relate to glass compositions and in particular, to glass compositions useful for thin film photovoltaic (PV) modules.

Technical Background

The fusion forming process typically produces flat glass with optimal surface and geometric characteristics useful for many electronics applications, for instance, substrates used in electronics applications, for example, display glass for LCD televisions, where the high quality of the surface is necessary to specialty glasses for photovoltaics modules.

Photovoltaic modules are used to convert sunlight into electricity. Two major types used or in development today are wafered modules using multiple silicon wafers connected together and thin film modules using one of a variety of inorganic then film materials, such as cadmium telluride (CdTe), copper indium gallium di-selenide (CIGS) or thin film (amorphous and microcrystalline) silicon. Typical packages for the thin film modules have a glass substrate, such as a soda lime glass, back contact, the semiconductor layer or layers, such as CIGS, a front transparent contact layer (TCO) and a protective cover layer, such as a glass substrate. The modules may further have edge seals, a metal frame, and electrical contacts.

There is a continuing drive to make PV technology competitive with existing power production methods, e.g., hydro, coal, nuclear, wind, etc., in the power generation industry. To do so, manufacturing costs, conversion efficiency, and efficiency degradation are some of the design challenges that need to be addressed. Soda lime glass has been a common substrate for CIGS because of its low cost and the fact that it contains sodium, which has been shown to yield a substantial open-circuit voltage increase in CIGS PV devices. However, soda lime glasses are not ideal for PV modules—the sodium delivery can be difficult to control, occur too quickly or in amounts too large. Further, soda lime glasses can have sodium release issues that occur due to environmental conditions. As soda lime glass ages in ambient conditions of temperature and humidity, its surface chemistry changes in a manner that results in a spatially non-uniform release of sodium during CIGS thin film deposition. These problems can lead to delamination issues and reduced efficiency. Clearly, there is still an unmet need to find glass compositions that provide optimal substrates for thin film PV devices.

BRIEF SUMMARY

A first aspect comprises a glass comprising $SiO_2$, $Al_2O_3$, and $Na_2O$, wherein the glass has a sodium release greater than 10 ppm in a buffered aqueous release test and a total sodium plus potassium release of less than 50 ppm in a buffered aqueous release test and a Tmargin=Tbreakdown−T35 kp>10° C. In some embodiments, the Na+K release is less than 30 ppm. In some embodiments, the glass has a coefficient of thermal expansion greater than 6 ppm/° C. In some embodiments, the glass has a strain point greater than 565° C. In some embodiments, the glass has a strain point greater than 585° C. In some embodiments, the glass has a liquidus viscosity greater than 130 kP.

In some embodiments, the glass further comprises at least one alkaline earth metal oxide and optionally, $B_2O_3$, ZnO, or $K_2O$. In other embodiments, the glass further comprises $B_2O_3$ and $K_2O$.

Another aspect comprises an electronic device comprising a glass comprising $SiO_2$, $Al_2O_3$, and $Na_2O$, wherein the glass has a sodium release greater than 10 ppm in a buffered aqueous release test and a total sodium plus potassium release of less than 50 ppm in a buffered aqueous release test and a Tmargin=Tbreakdown−T35 kp>10° C. In some embodiments, the device comprises a photovoltaic module.

Another aspect comprises a glass comprising $SiO_2$, $Al_2O_3$, $Na_2O$, $B_2O_3$, $K_2O$, and at least one alkaline earth metal oxide, wherein the glass has a Na release greater than 10 ppm in a buffered aqueous release test and a total Na+K release of less than 50 ppm in a buffered aqueous release test, a Tmargin=Tbreakdown−T35 kp>10° C., a coefficient of thermal expansion greater than 6 ppm/° C., and a strain point greater than 565° C.

Another aspect comprises a glass comprising, in mol %:
65-80 $SiO_2$
3-13 $Al_2O_3$
0-5.5 $B_2O_3$
>0-10 MgO
0-10 CaO
0-10 SrO
1-12 $Na_2O$
and 1≤R'O≤15, wherein R'O=MgO+CaO+SrO+BaO.

In some embodiments, the glass comprises in mol %:
65-80 $SiO_2$
3-13 $Al_2O_3$
0-5 $B_2O_3$
2-7 MgO
>0-7 CaO
0-6 SrO
1-12 $Na_2O$
wherein 4.5≤R'O≤12.

In some embodiments, the glasses above further comprise 0≤$K_2O$≤10 and 2≤R2O≤13.1, wherein R2O=$K_2O$+$Na_2O$.

In some embodiments, the glass comprises in mol %:
70-77 $SiO_2$
4.5-10.5 $Al_2O_3$
>0-5 $B_2O_3$
3-5 MgO
>0-5 CaO
0-5 SrO
1.8-11.8 $Na_2O$
>0-9 $K_2O$
and wherein 2.3≤R2O≤13.1 and 4.5≤R'O≤12.

Another aspect comprises an electronic device comprising one of the glasses above. In some embodiments, the device comprises a photovoltaic module.

Another aspect comprises a glass comprising, in mol %:
65-80 $SiO_2$
3-13 $Al_2O_3$
0-5.5 $B_2O_3$
>0-10 MgO
0-10 CaO
0-10 SrO
1-12 $Na_2O$ and 1≤R'O≤15, wherein R'O=MgO+CaO+SrO+BaO, wherein the glass has a Na release greater than 10 ppm in a buffered aqueous release test and a total Na+K release of less than 50 ppm in a buffered aqueous release test. In some embodiments, the glass has a Tmargin=Tbreakdown−T35 kp>10° C. In some embodiments, the Na+K release is less than 30 ppm. In some embodiments, the glass has a coefficient of thermal expansion greater than 6 ppm/° C. In some embodiments, the glass has a strain point greater than 565° C. In some embodiments, the glass has a strain point greater than 585° C. In some embodiments, the glass has a liquidus viscosity greater than 130 kP.

Another aspect comprises an electronic device comprising a glass comprising, in mol %:
65-80 $SiO_2$
3-13 $Al_2O_3$
0-5.5 $B_2O_3$
>0-10 MgO
0-10 CaO
0-10 SrO
1-12 $Na_2O$
and 1≤R'O≤15, wherein R'O=MgO+CaO+SrO+BaO, wherein the glass has a Na release greater than 10 ppm in a buffered aqueous release test and a total Na+K release of less than 50 ppm in a buffered aqueous release test. In some embodiments, the glass has a Tmargin=Tbreakdown−T35 kp>10° C. In some embodiments, the device comprises a photovoltaic module.

Another aspect comprises a glass comprising, in mol %:
70-77 $SiO_2$
4.5-10.5 $Al_2O_3$
>0-5 $B_2O_3$
3-5 MgO
>0-5 CaO
>0-5 SrO
1.8-11.8 $Na_2O$
>0-9 $K_2O$
wherein 2.3≤$R_2O$≤13.1 and 4.5≤R'O≤12, and the glass has a Na release greater than 10 ppm in a buffered aqueous release test and a total Na+K release of less than 50 ppm in a buffered aqueous release test, a Tmargin=Tbreakdown−T35 kp>10° C., a coefficient of thermal expansion greater than 6 ppm/° C., and a strain point greater than 565° C. In some embodiments, the glass has a liquidus viscosity of greater than 130 kP.

In another aspect, the glass sheets listed above have an average surface roughness ($R_a$) of ≤20 Å, preferably ≤10 Å, wherein the glass sheet has not been polished. In another aspect of the photovoltaic modules comprising the glasses listed above, at least one of the glass substrates has a thickness below 3 mm, and the glass substrate has a curvature deformation, W, less than 0.5 micrometer/cm$^2$, as described by the equation W=D/L$^2$, wherein D is the maximum curvature of glass substrate in □m and L is the diagonal length of glass substrate in cm.

In another aspect of the glasses listed above, at least one glass sheet has a thickness of 1.8 mm or less. In another aspect of the photovoltaic modules comprising the glasses listed above, at least one of the glass sheets has a thickness of 0.5 mm or less. In some embodiments, the glass sheet having a thickness of 0.5 mm or less is capable of being processed under roll-to-roll conditions. In another aspect of the photovoltaic modules comprising the glasses listed above, the module further comprises a Na-containing structural glass sheet having a thickness of greater than 1.5 mm. In another aspect of the photovoltaic modules comprising the glasses listed above, the glass further comprises >0-1 mol % $CeO_2$, $Fe_2O_3$, or $TiO_2$.

In another aspect, the photovoltaic modules comprising the glasses listed above further comprise a hermetic/watertight seal along the edge and between the first and second outer protective layers to form a hermetically sealed cavity comprising the at least one crystalline silicon solar cell wafer.

These and other aspects, advantages, and salient features will become apparent from the following detailed description, the accompanying drawings, and the appended claims.

DETAILED DESCRIPTION

In the following detailed description, numerous specific details may be set forth in order to provide a thorough understanding of embodiments of the invention. However, it will be clear to one skilled in the art when embodiments of the invention may be practiced without some or all of these specific details. In other instances, well-known features or processes may not be described in detail so as not to unnecessarily obscure the invention. In addition, like or identical reference numerals may be used to identify common or similar elements. Moreover, unless otherwise defined, all technical and scientific terms used herein have the same meaning as commonly understood by one of ordinary skill in the art to which this invention belongs. In case of conflict, the present specification, including the definitions herein, will control.

Although other methods and can be used in the practice or testing of the invention, certain suitable methods and materials are described herein.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and/or C; D, E, and/or F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and/or C; D, E, and/or F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

Moreover, where a range of numerical values is recited herein, comprising upper and lower values, unless otherwise stated in specific circumstances, the range is intended to include the endpoints thereof, and all integers and fractions within the range. It is not intended that the scope of the invention be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or endpoint referred to.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; more specifically, the phrase "A or B" means "A, B, or both A and B". Exclusive "or" is designated herein by terms such as "either A or B" and "one of A or B", for example.

The indefinite articles "a" and "an" are employed to describe elements and components of the invention. The use of these articles means that one or at least one of these elements or components is present. Although these articles are conventionally employed to signify that the modified noun is a singular noun, as used herein the articles "a" and "an" also include the plural, unless otherwise stated in specific instances. Similarly, the definite article "the", as used herein, also signifies that the modified noun may be singular or plural, again unless otherwise stated in specific instances.

For the purposes of describing the embodiments, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

It is noted that one or more of the claims may utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

As a result of the raw materials and/or equipment used to produce the glass composition of the present invention, certain impurities or components that are not intentionally added, can be present in the final glass composition. Such materials are present in the glass composition in minor amounts and are referred to herein as "tramp materials."

As used herein, a glass composition having 0 mol % of a compound is defined as meaning that the compound, molecule, or element was not purposefully added to the composition, but the composition may still comprise the compound, typically in tramp or trace amounts. Similarly, "iron-free," "alkali earth metal-free," "heavy metal-free" or the like are defined to mean that the compound, molecule, or element was not purposefully added to the composition, but the composition may still comprise iron, alkaline earth metals, or heavy metals, etc., but in approximately tramp or trace amounts.

The glasses described herein may be generically described as sodium-containing aluminosilicate (or boroaluminosilicate if $B_2O_3$ is present) glasses and comprise $SiO_2$, $Al_2O_3$, and $Na_2O$. They may further contain alkaline earth metal salts, such as MgO, BaO, SrO, or CaO, as well as $K_2O$, $B_2O_3$ and a number of other components as described below. In some embodiments, the glasses have been designed to release a specified amount of sodium (as used herein, the terms "sodium" or "Na" comprise sodium ions, sodium metal, sodium oxides, along with other sodium-containing materials. Further, as used herein, the release or diffusion of "sodium" refers to and comprises the movement of sodium ions along with the movement in the glass of sodium metal, sodium oxides or other sodium-containing materials) which in some embodiments is utilized by semiconductor thin films, such as CIGS thin films. In some embodiments, the design of the glasses was optimized via modeling of the sodium release based on calculations incorporating the constituents of the composition and their relative amounts. These models allowed for targeted design of the glass compositions that provide the appropriate release or diffusion rates for thin film systems.

Sodium diffusion into the CIGS thin film has been shown to improve cell efficiency. The sodium-containing aluminosilicate and boroaluminosilicate glasses described herein are particularly useful for thin-film photovoltaic applications. More specifically, these glasses are ideal for use in CIGS photovoltaic modules where at least some of the sodium required to optimize cell efficiency is to be derived from the substrate glass. In these processes, a minimum amount of sodium must be released from the glass into the CIGS film to increase efficiency, but the amount should ideally be closely controlled as too much may lead to issues in the process, such as poor film adhesion to the glass substrate. Additionally, an optimal CIGS substrate should have a CTE high enough to mitigate thermal expansion mismatch with the CIGS layer, and have strain points high enough to allow the use of thinner substrates and/or higher processing temperatures.

Accordingly, glasses described herein comprise controlled sodium release rates as measured by the "buffered aqueous release" test (defined below), CTEs closely matched to CIGS thin films, or strain points sufficiently high enough to allow for high temperature processing. Additionally, the glasses are designed to maintain manufacturability by keeping the melting temperatures (as defined by the temperature at which the viscosity is 400 P) reasonable. The glasses described herein are ideal for forming glass sheets by any number of processes, but especially by the fusion process, wherein the glass requires a liquidus viscosity in excess of 130 kP. Finally, not only are the glasses ideal for fusion forming, they are fully compatible with a zircon isopipe, a traditional material used in fusion forming.

$SiO_2$, an oxide involved in the formation of glass, functions to stabilize the networking structure of glass. In some embodiments, the glass composition comprises from 65 to about 80 mol % $SiO_2$. In some embodiments, the glass composition comprises from 70 to about 77 mol % $SiO_2$. In some embodiments, the glass composition can comprise from about 65 to about 80 mol %, about 65 to about 77 mol %, about 65 to about 75 mol %, about 65 to about 70 mol %, about 68 to about 80 mol %, about 68 to about 77 mol %, about 68 to about 75 mol %, about 68 to about 70 mol %, about 70 to about 80 mol %, about 70 to about 77 mol %, about 70 to about 75 mol %, about 75 to about 80 mol %, about 75 to about 77 mol %, or about 77 to about 80 mol % $SiO_2$. In some embodiments, the glass composition comprises about 65, 66, 67, 68, 69, 70, 71, 72, 73, 74, 75, 76, 77, 78, 79, or 80 mol % $SiO_2$.

$Al_2O_3$ may provide for a) maintaining the lowest possible liquidus temperature, b) lowering the expansion coefficient, or c) enhancing the strain point. In some embodiments, the glass composition can comprise from about 3 to about 13 mol % $Al_2O_3$. In some embodiments, the glass composition can comprise from about 4.5 to about 10.5 mol % $Al_2O_3$. In some embodiments, the glass composition can comprise from about 3 to about 13 mol %, about 3 to about 11.5 mol %, about 3 to about 10.5 mol %, about 3 to about 9 mol %, about 3 to about 5 mol %, about 5 to about 13 mol %, about 5 to about 11.5 mol %, about 5 to about 10.5 mol %, about 5 to about 9 mol %, about 9 to about 13 mol %, about 9 to about 11.5 mol %, about 9 to about 10.5 mol %, about 10.5 to about 13 mol %, about 10.5 to about 11.5 mol %, or about 11.5 to about 13 mol % $Al_2O_3$. In some embodiments, the glass composition can comprise about 3, 3.5, 4, 4.5, 5, 5.5, 6, 7, 8, 9, 9.5, 10, 10.5, 11, 11.5, 12, 12.5, or 13 mol % $Al_2O_3$.

As noted previously, the glass compositions comprise sodium as a source for the thin film semiconductor. The sodium content is uniquely tailored in the glass compositions to allow for the proper balance of catalytic effect without causing adhesion or other issues. In some embodiments, the glass can comprise from about 1 to about 12 mol % $Na_2O$. In other embodiments, the glass can comprise from about 1.8 to about 11.8 mol % $Na_2O$. In some embodiments, the glass composition can comprise from about 1 to about 12 mol %, about 1 to about 11.8 mol %, about 1 to about 11 mol % about 1 to about 10.5 mol %, about 1 to about 10 mol %, about 1 to about 9 mol %, about 1 to about 8 mol %, about 1 to about 7 mol %, about 1 to about 6.5 mol %, about 1 to about 6 mol %, about 1 to about 5.5 mol %, about 1 to about 5 mol %, about 1 to about 4 mol %, about 1 to about 3 mol %, about 1 to about 1.8 mol %, about 1.8 to about 12 mol %, about 1.8 to about 11.8 mol %, about 1.8 to about 11 mol % about 1.8 to about 10.5 mol %, about 1.8 to about 10 mol %, about 1.8 to about 9 mol %, about 1.8 to about 8 mol %, about 1.8 to about 7 mol %, about 1.8 to about 6.5 mol %, about 1.8 to about 6 mol %, about 1.8 to about 5.5 mol %, about 1.8 to about 5 mol %, about 1.8 to about 4 mol %, about 1.8 to about 3 mol %, about 3 to about 12 mol %, about 3 to about 11.8 mol %, about 3 to about 11 mol %, about 3 to about 10.5 mol %, about 3 to about 10 mol %, about 3 to about 9 mol %, about 3 to about 8 mol %, about 3 to about 7 mol %, about 3 to about 6.5 mol %, about 3 to about 6 mol %, about 3 to about 5.5 mol %, about 3 to about 5 mol %, about 3 to about 4 mol %, about 4 to about 12 mol %, about 4 to about 11.8 mol %, about 4 to about 11 mol %, about 4 to about 10.5 mol %, about 4 to about 10 mol %, about 4 to about 9 mol %, about 4 to about 8 mol %, about 4 to about 7 mol %, about 4 to about 6.5 mol %, about 4 to about 6 mol %, about 4 to about 5.5 mol %, about 4 to about 5 mol %, about 5 to about 12 mol %, about 5 to about 11.8 mol %, about 5 to about 10.5 mol %, about 5 to about 10 mol %, about 5 to about 9 mol %, about 5 to about 8 mol %, about 5 to about 7 mol %, about 5 to about 6.5 mol %, about 5 to about 6 mol %, about 5 to about 5.5 mol %, about 5.5 to about 12 mol %, about 5.5 to about 11.8 mol %, about 5.5 to about 10.5 mol %, about 5.5 to about 10 mol %, about 5.5 to about 9 mol %, about 5.5 to about 8 mol %, about 5.5 to about 7 mol %, about 5.5 to about 6.5 mol %, about 5.5 to about 6 mol %, about 6 to about 12 mol %, about 6 to about 11.8 mol %, about 6 to about 10.5 mol %, about 6 to about 10 mol %, about 6 to about 9 mol %, about 6 to about 8 mol %, about 6 to about 7 mol %, about 6.5 to about 12 mol %, about 6.5 to about 11.8 mol %, about 6.5 to about 10.5 mol %, about 6.5 to about 10 mol %, about 6.5 to about 9 mol %, about 6.5 to about 8 mol %, about 6.5 to about 7 mol %, about 7 to about 12 mol %, about 7 to about 11.8 mol %, about 7 to about 10.5 mol %, about 7 to about 10 mol %, about 7 to about 9 mol %, about 7 to about 8 mol %, about 8 to about 12 mol %, about 8 to about 11.8 mol %, about 8 to about 10.5 mol %, about 8 to about 10 mol %, about 8 to about 9 mol %, about 9 to about 12 mol %, about 9 to about 11.8 mol %, about 9 to about 10.5 mol %, about 9 to about 10 mol %, about 10 to about 12 mol %, about 10 to about 11.8 mol %, about 10 to about 10.5 mol %, about 10.5 to about 12 mol %, about 10.5 to about 11.8 mol %, or about 11.8 to about 12 mol % $Na_2O$. In some embodiments, the glass can comprise about 1, 1.8, 2, 3, 4, 4.5, 5, 5.5, 6, 6.5, 7, 8, 9, 10, 10.5, 11, 11.8, 12 mol % $Na_2O$.

$B_2O_3$ can be used as a flux to soften glasses, making them easier to melt. $B_2O_3$ may also react with non-bridging oxygen atoms (NBOs), converting the NBOs to bridging oxygen atoms through the formation of $BO_4$ tetrahedra, which increases the toughness of the glass by minimizing the number of weak NBOs. $B_2O_3$ also lowers the hardness of the glass which, when coupled with the higher toughness, decreases the brittleness, thereby resulting in a mechanically durable glass, which can be advantageous for substrates used in photovoltaic applications. In some embodiments, the glass composition can comprise from 0 to about 5 mol % $B_2O_3$. In some embodiments, the glass composition can comprise from greater than 0 to about 5 mol % $B_2O_3$. In some embodiments, the glass composition can comprise from 0 to about 5 mol %, 0 to 4 mol %, 0 to 3 mol %, 0 to about 2 mol %, 0 to about 1 mol %, >0 to about 5 mol %, >0 to about 4 mol %, >0 to about 3 mol %, >0 to about 2 mol %, >0 to about 1 mol %, about 1 to about 5 mol %, about 1 to about 4 mol %, about 1 to about 3 mol %, about 1 to about 2 mol %, about 2 to about 5 mol %, about 2 to about 4 mol %, about 2 to about 3 mol %, about 3 to about 5 mol %, about 3 to about 4 mol %, or about 4 to about 5 mol % $B_2O_3$. In some embodiments, the glass composition can comprise about 0, >0, 1, 2, 3, 4, or 5 mol % $B_2O_3$.

MgO, CaO, SrO, and BaO can be used to inhibit the release of sodium from the glass, tailor the liquidus viscosity, and increase strain points. Further, alkaline earth metal oxides are effective in decreasing the viscosity of glass at a higher temperature and enhancing the viscosity of glass at a lower temperature and may be useful in improving the melting properties of the glass. However, if excessive amounts of both MgO and CaO are used, there is an increasing trend toward phase separation and devitrification of the glass. As defined herein, R'O comprises the mol % of MgO, CaO, SrO, and BaO. In some embodiments, the glass composition can comprise from about 1 to about 15 mol % R'O. In some embodiments, the glass composition can comprise from about 4.5 to about 12 mol % R'O. In some embodiments, the glass composition can comprise from about 1 to about 15 mol %, about 1 to about 13 mol %, about 1 to about 12 mol %, about 1 to about 10 mol %, about 1 to about 8 mol %, about 1 to about 6 mol %, about 1 to about 4.5 mol %, about 4.5 to about 15 mol %, about 4.5 to about 13 mol %, about 4.5 to about 12 mol %, about 4.5 to about 10 mol %, about 4.5 to about 8 mol %, about 4.5 to about 6 mol %, about 6 to about 15 mol %, about 6 to about 13 mol %, about 6 to about 12 mol %, about 6 to about 10 mol %, about 6 to about 8 mol %, about 8 to about 15 mol %, about 8 to about 13 mol %, about 8 to about 12 mol %, about 8 to about 10 mol %, about 10 to about 15 mol %, about 10 to about 13 mol %, about 10 to about 12 mol %, about 12 to about 15 mol %, about 12 to about 13 mol %, or about 13 to about 15 mol % R'O. In some embodiments, the glass composition can comprise about 3, 4, 4.5, 5, 6, 7, 8, 9, 10, 11, 12, 13, 14, or 15 mol % R'O.

In some embodiments, MgO can be added to the glass to lower high temperature viscosity while maintaining a strain point. It is also useful in reducing melting temperature, increasing strain point, or adjusting CTE when used in combination with other alkaline earth compounds (e.g., CaO, SrO, and BaO). In some embodiments, the glass can comprise >0 to about 10 mol % MgO. In some embodiments, the glass composition can comprise about 2 to about 7 mol % MgO. In some embodiments, the glass composition can comprise about 3 to about 5 mol % MgO. In some embodiments, the glass composition can comprise >0 to about 10 mol %, >0 to about 9 mol %, >0 to about 8 mol %, >0 to about 7 mol %, >0 to about 6 mol %, >0 to about 5 mol %, >0 to about 4 mol %, >0 to about 3 mol %, >0 to about 2 mol %, >0 to about 1 mol %, about 1 to about 10 mol %, about 1 to about 9 mol %, about 1 to about 7 mol %, about 1 to about 5 mol %, about 1 to about 4 mol %, about 1 to about 3 mol %, about 1 to about 2 mol %, about 2 to about 10 mol %, about 2 to about 9 mol %, about 2 to about 7 mol %, about 2 to about 5 mol %, about 2 to about 4 mol %, about 2 to about 3 mol %, about 3 to about 10 mol %, about 3 to about 8 mol %, about 3 to about 7 mol %, about 3 to about 5 mol %, about 3 to about 4 mol %, about 4 to about 10 mol %, about 4 to about 8 mol %, about 4 to about 7 mol %, about 4 to about 5 mol %, about 5 to about 10 mol %, about 5 to about 9 mol %, about 5 to about 7 mol %, about 7 to about 10 mol %, about 7 to about 9 mol %, about 9 to about 10 mol % MgO. In some embodiments, the glass compositions can comprise about 0, >0, 1, 2, 3, 4, 5, 6, 7, 8, 9, or 10 mol % MgO.

In some embodiments, CaO can inhibit sodium release, raise strain point, lower density, or lower melting temperature. More generally, it can be a component of certain possible devitrification phases, particularly anorthite ($CaAl_2Si_2O_8$), and this phase has complete solid solution with an analogous sodium phase, albite ($NaAlSi_3O_8$). CaO sources include limestone, an inexpensive material, so to the extent that volume and low cost are factors, in some embodiments it is can be useful to make the CaO content as high as can be reasonably achieved relative to other alkaline earth oxides. In some embodiments, the glass composition can comprise from 0 to about 10 mol % CaO. In some embodiments, the glass composition about from >0 to about 10 mol % CaO. In some embodiments, the glass composition can comprise from >0 to about 6 mol % CaO. In some embodiments, the glass composition can comprise from >0 to about 5 mol % CaO. In some embodiments, the glass composition can comprise from 0 to about 10 mol %, 0 to about 8 mol %, 0 to about 6 mol %, 0 to about 5 mol %, 0 to about 4 mol %, 0 to 3 mol %, 0 to 2 mol %, 0 to about 1 mol %, >0 to about 10 mol %, >0 to about 8 mol %, >0 to about 6 mol %, >0 to about 5 mol %, >0 to about 4 mol %, >0 to 3 mol %, >0 to 2 mol %, >0 to about 1 mol %, 1 to about 10 mol %, about 1 to about 8 mol %, about 1 to about 6 mol %, about 1 to about 5 mol %, about 1 to about 4 mol %, about 1 to 3 mol %, about 1 to 2 mol %, about 2 to about 10 mol %, about 2 to about 8 mol %, about 2 to about 6 mol %, about 2 to about 5 mol %, about 2 to about 4 mol %, about 2 to 3 mol %, about 3 to about 10 mol %, about 3 to about 8 mol %, about 3 to about 6 mol %, about 3 to about 5 mol %, about 3 to about 4 mol %, about 4 to about 10 mol %, about 4 to about 8 mol %, about 4 to about 6 mol %, about 4 to about 5 mol %, about 5 to about 10 mol %, about 5 to about 8 mol %, about 5 to about 6 mol %, about 6 to about 10 mol %, about 6 to about 8 mol %, or about 8 to about 10 mol % CaO. In some embodiments, the glass composition can comprise about 0, >0, 1, 2, 3, 4, 5, 6, 7, 8, 9, or 10 mol % CaO.

In some embodiments, the glasses can comprise 0 to 10 mol % SrO. SrO can inhibit sodium release. Further, SrO can contribute to higher coefficient of thermal expansion, and the relative proportion of SrO and CaO can be manipulated to improve liquidus temperature, and thus liquidus viscosity. In some embodiments, the glass composition can comprise from 0 to about 10 mol % SrO. In some embodiments, the glass composition about from 0 to about 6 mol % SrO. In some embodiments, the glass composition can comprise from 0 to about 5 mol % SrO. In some embodiments, the glass composition can comprise from >0 to about 4 mol % SrO. In some embodiments, the glass composition can comprise from 0 to about 10 mol %, 0 to about 8 mol %, 0 to about 6 mol %, 0 to about 5 mol %, 0 to about 4 mol %, 0 to 3 mol %, 0 to 2 mol %, 0 to about 1 mol %, >0 to about 10 mol %, >0 to about 8 mol %, >0 to about 6 mol %, >0 to about 5 mol %, >0 to about 4 mol %, >0 to 3 mol %, >0 to 2 mol %, >0 to about 1 mol %, 1 to about 10 mol %, about 1 to about 8 mol %, about 1 to about 6 mol %, about 1 to about 5 mol %, about 1 to about 4 mol %, about 1 to 3 mol %, about 1 to 2 mol %, about 2 to about 10 mol %, about 2 to about 8 mol %, about 2 to about 6 mol %, about 2 to about 5 mol %, about 2 to about 4 mol %, about 2 to 3 mol %, about 3 to about 10 mol %, about 3 to about 8 mol %, about 3 to about 6 mol %, about 3 to about 5 mol %, about 3 to about 4 mol %, about 4 to about 10 mol %, about 4 to about 8 mol %, about 4 to about 6 mol %, about 4 to about 5 mol %, about 5 to about 10 mol %, about 5 to about 8 mol %, about 5 to about 6 mol %, about 6 to about 10 mol %, about 6 to about 8 mol %, or about 8 to about 10 mol % SrO. In some embodiments, the glass composition can comprise about 0, >0, 1, 2, 3, 4, 5, 6, 7, 8, 9, or 10 mol % SrO.

BaO can inhibit sodium release and can also increase the glass density. In some embodiments, the glass composition can comprise from 0 to about 10 mol % BaO. In some embodiments, the glass composition about from 0 to about 6 mol % BaO. In some embodiments, the glass composition can comprise from 0 to about 5 mol % BaO. In some embodiments, the glass composition can comprise from >0 to about 4 mol % BaO. In some embodiments, the glass composition can comprise from 0 to about 10 mol %, 0 to about 8 mol %, 0 to about 6 mol %, 0 to about 5 mol %, 0 to about 4 mol %, 0 to 3 mol %, 0 to 2 mol %, 0 to about 1 mol %, >0 to about 10 mol %, >0 to about 8 mol %, >0 to about 6 mol %, >0 to about 5 mol %, >0 to about 4 mol %, >0 to 3 mol %, >0 to 2 mol %, >0 to about 1 mol %, 1 to about 10 mol %, about 1 to about 8 mol %, about 1 to about 6 mol %, about 1 to about 5 mol %, about 1 to about 4 mol %, about 1 to 3 mol %, about 1 to 2 mol %, about 2 to about 10 mol %, about 2 to about 8 mol %, about 2 to about 6 mol %, about 2 to about 5 mol %, about 2 to about 4 mol %, about 2 to 3 mol %, about 3 to about 10 mol %, about 3 to about 8 mol %, about 3 to about 6 mol %, about 3 to about 5 mol %, about 3 to about 4 mol %, about 4 to about 10 mol %, about 4 to about 8 mol %, about 4 to about 6 mol %, about 4 to about 5 mol %, about 5 to about 10 mol %, about 5 to about 8 mol %, about 5 to about 6 mol %, about 6 to about 10 mol %, about 6 to about 8 mol %, or about 8 to about 10 mol % BaO. In some embodiments, the glass composition can comprise about 0, >0, 1, 2, 3, 4, 5, 6, 7, 8, 9, or 10 mol % BaO.

Generally, alkali cations can raise the CTE steeply, but also can lower the strain point and, depending upon how they are added, they can increase melting temperatures. The least effective alkali oxide for raising CTE is $Li_2O$, and the most effective alkali oxide for raising CTE is $Cs_2O$. In some embodiments, the glass composition can comprise from about 1 to about 13.1 mol % $R_2O$, wherein R is one or more of the alkali cations Na and K. In some embodiments, the glass composition can comprise from about 2 to about 13.1 mol % $R_2O$. In some embodiments, the glass composition can comprise from about 2.3 to about 13.1 mol % $R_2O$. In some embodiments, the glass composition can comprise from 1 to about 18 mol % $M_2O$, wherein M is one or more of the alkali cations Na, Li, K, Rb, and Cs. In some embodiments, $R_2O$ or $M_2O$ can comprise only trace amounts of $Na_2O$. In some embodiments, $R_2O$ or $M_2O$ can comprise only trace amounts of $K_2O$. In some embodiments, the glass composition can comprises from about 2 to about 13.1 mol %, about 2 to about 12 mol %, about 2 to about 11 mol %, about 2 to about 10 mol %, about 2 to about 7 mol %, about 2 to about 5 mol %, about 2 to about 4 mol %, about 2 to about 3 mol %, about 2.3 to about 13.1 mol %, about 2.3 to about 12 mol %, about 2.3 to about 11 mol %, about 2.3 to about 10 mol %, about 2.3 to about 7 mol %, about 2.3 to about 5 mol %, about 2.3 to about 4 mol %, about 2.3 to about 3 mol %, about 3 to about 13.1 mol %, about 3 to about 12 mol %, about 3 to about 11 mol %, about 3 to about 10 mol %, about 3 to about 7 mol %, about 3 to about 5 mol %, about 3 to about 4 mol %, about 4 to about 13.1 mol %, about 4 to about 12 mol %, about 4 to about 11 mol %, about 4 to about 10 mol %, about 4 to about 7 mol %, about 4 to about 5 mol %, about 5 to about 13.1 mol %, about 5 to about 12 mol %, about 5 to about 11 mol %, about 5 to about 10 mol %, about 5 to about 7 mol %, about 7 to about 13.1 mol %, about 7 to about 12 mol %, about 7 to about 11 mol %, about 7 to about 10 mol %, about 10 to about 13.1 mol %, about 10 to about 12 mol %, about 10 to about 11 mol %, about 11 to about 13.1 mol %, about 11 to about 12 mol %, or about 12 to about 13.1 mol % $R_2O$. In some embodiments, the glass compositions comprises about 2, 3, 4, 5, 6, 7, 8, 9, 10, 11, 12, or 13.1 mol % $R_2O$.

In some embodiments, the glass composition can com- prises from about 1 to about 18 mol %, about 1 to about 16 mol %, about 1 to about 14 mol %, about 1 to about 10 mol %, about 1 to about 7 mol %, about 1 to about 5 mol %, about 1 to about 3 mol %, about 3 to about 18 mol %, about 3 to about 16 mol %, about 3 to about 14 mol %, about 3 to about 10 mol %, about 3 to about 7 mol %, about 3 to about 5 mol %, about 5 to about 18 mol %, about 5 to about 16 mol %, about 5 to about 14 mol %, about 5 to about 10 mol %, about 5 to about 7 mol %, about 7 to about 18 mol %, about 7 to about 16 mol %, about 7 to about 14 mol %, about 7 to about 10 mol %, about 10 to about 18 mol %, about 10 to about 16 mol %, about 10 to about 14 mol %, about 14 to about 18 mol %, about 14 to about 16 mol %, or about 16 to about 18 mol % $M_2O$. In some embodiments, the glass compositions comprises about 1, 2, 3, 4, 5, 6, 7, 8, 9, 10, 11, 12, 13, 14, 15, 16, 17, or 18 mol % $M_2O$ Potassium may be found in compositions described herein and, much like sodium, may have substantial mobility and may drift out of the glass. In some embodiments, $K_2O$ is present to increase CTE and strain point or aid in the inhibition of sodium release. In some embodiments, the glass can comprise from 0 to about 10 mol % $K_2O$. In some embodiments, the glass composition can comprise greater than 0 to about 9 mol % $K_2O$. In some embodiments, the glass composition can comprise about 0.5 to about 9 mol % $K_2O$. In some embodiments, the glass composition can comprise from 0 to about 10 mol %, 0 to about 8 mol %, 0 to about 6 mol %, 0 to about 5 mol %, 0 to about 4 mol %, 0 to 3 mol %, 0 to 2 mol %, 0 to about 1 mol %, >0 to about 10 mol %, >0 to about 8 mol %, >0 to about 6 mol %, >0 to about 5 mol %, >0 to about 4 mol %, >0 to 3 mol %, >0 to 2 mol %, >0 to about 1 mol %, 1 to about 10 mol %, about 1 to about 8 mol %, about 1 to about 6 mol %, about 1 to about 5 mol %, about 1 to about 4 mol %, about 1 to 3 mol %, about 1 to 2 mol %, about 2 to about 10 mol %, about 2 to about 8 mol %, about 2 to about 6 mol %, about 2 to about 5 mol %, about 2 to about 4 mol %, about 2 to 3 mol %, about 3 to about 10 mol %, about 3 to about 8 mol %, about 3 to about 6 mol %, about 3 to about 5 mol %, about 3 to about 4 mol %, about 4 to about 10 mol %, about 4 to about 8 mol %, about 4 to about 6 mol %, about 4 to about 5 mol %, about 5 to about 10 mol %, about 5 to about 8 mol %, about 5 to about 6 mol %, about 6 to about 10 mol %, about 6 to about 8 mol %, or about 8 to about 10 mol % $K_2O$. In some embodiments, the glass composition can comprise about 0, >0, 1, 2, 3, 4, 5, 6, 7, 8, 9, or 10 mol % $K_2O$.

In some embodiments, the glass further includes a chemi- cal fining agent. Such fining agents include, but are not limited to, $SnO_2$, $As_2O_3$, $Sb_2O_3$, F, Cl and Br. In some embodiments, the concentrations of the chemical fining agents are kept at a level of 3, 2, 1, or 0.5 mol % or less. Chemical fining agents may also include $CeO_2$, $Fe_2O_3$, and other oxides of transition metals, such as $MnO_2$. These oxides may introduce color to the glass via visible absorp- tions in their final valence state(s) in the glass, and thus their concentration is usually kept at a level of 0.5, 0.4, 0.3, or 0.2 mol % or less.

$As_2O_3$ is an effective high temperature fining agent for AMLCD glasses, and in some aspects described herein, $As_2O_3$ is used for fining because of its superior fining properties. However, $As_2O_3$ is poisonous and requires spe- cial handling during the glass manufacturing process. Accordingly, in certain aspects, fining is performed without the use of substantial amounts of $As_2O_3$, i.e., the finished glass has at most 0.05 mole percent $As_2O_3$. In one aspect, no $As_2O_3$ is purposely used in the fining of the glass. In such cases, the finished glass will typically have at most 0.005 mole percent $As_2O_3$ as a result of contaminants present in the batch materials and/or the equipment used to melt the batch materials.

Although not as toxic as $As_2O_3$, $Sb_2O_3$ is also poisonous and requires special handling. In addition, $Sb_2O_3$ raises the density, raises the CTE, and lowers the annealing point in comparison to glasses that use $As_2O_3$ or $SnO_2$ as a fining agent. Accordingly, in certain aspects, fining is performed without the use of substantial amounts of $Sb_2O_3$, i.e., the finished glass has at most 0.05 mole percent $Sb_2O_3$. In another aspect, no $Sb_2O_3$ is purposely used in the fining of the glass. In such cases, the finished glass will typically have at most 0.005 mole percent $Sb_2O_3$ as a result of contaminants present in the batch materials and/or the equipment used to melt the batch materials.

Compared to $As_2O_3$ and $Sb_2O_3$ fining, tin fining (i.e., $SnO_2$ fining) is less effective, but $SnO_2$ is a ubiquitous material that has no known hazardous properties. Tin fining can be used alone or in combination with other fining techniques if desired. For example, tin fining can be combined with halide fining, e.g., bromine fining. Other possible combinations include, but are not limited to, tin fining plus sulfate, sulfide, cerium oxide, mechanical bubbling, and/or vacuum fining. It is contemplated that these other fining techniques can be used alone. U.S. Pat. Nos. 5,785,726, 6,128,924, 5,824,127 and co-pending U.S. application Ser. No. 11/116,669, all of which are hereby incorporated by reference in their entireties, disclose processes for manufacturing arsenic-free glasses. U.S. Pat. No. 7,696,113, incorporated by reference in its entirety, discloses a process for manufacturing arsenic- and antimony-free glass using iron and tin to minimize gaseous inclusions.

The glasses can also contain $SnO_2$ either as a result of Joule melting using tin-oxide electrodes, through the batching of tin containing materials, e.g., $SnO_2$, SnO, $SnCO_3$, $SnC_2O_2$, etc., or through addition of $SnO_2$ as an agent to adjust various physical, melting, and forming attributes. The glass can comprise from 0 to about 3 mol %, 0 to about 2 mol %, 0 to about 1 mol %, 0 to 0.5 mol %, or 0 to 0.1 mol % $SnO_2$.

In some embodiments, the glass can be substantially free of $Sb_2O_3$, $As_2O_3$, or combinations thereof. For example, the glass can comprise 0.05 weight percent or less of $Sb_2O_3$ or $As_2O_3$ or a combination thereof, the glass may comprise zero weight percent of $Sb_2O_3$ or $As_2O_3$ or a combination thereof, or the glass may be, for example, free of any intentionally added $Sb_2O_3$, $As_2O_3$, or combinations thereof.

Additional components can be incorporated into the glass compositions to provide additional benefits. For example, additional components can be added to adjust various physical, melting, and forming attributes. In some embodiments, the glass may comprise one or more compounds useful as ultraviolet radiation absorbers. In some embodiments, the glass can comprise 3 mol % or less $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $Fe_2O_3$, $CeO_2$, or combinations thereof. In some embodiments, the glass can comprise from 0 to about 3 mol %, 0 to about 2 mol %, 0 to about 1 mol %, 0 to 0.5 mol %, 0 to 0.1 mol %, 0 to 0.05 mol %, or 0 to 0.01 mol % $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$ or combinations thereof. In some embodiments, the glass can comprise from 0 to about 3 mol %, 0 to about 2 mol %, 0 to about 1 mol %, 0 to about 0.5 mol %, $TiO_2$.

The glasses, according to some embodiments, can further comprise contaminants typically found in commercially-prepared glass. In addition, or alternatively, a variety of other oxides (e.g., $TiO_2$, MnO, ZnO, $Nb_2O_5$, $MoO_3$, $Ta_2O_5$, $WO_3$, $ZrO_2$, $Y_2O_3$, $La_2O_3$, $P_2O_5$, and the like) may be added, albeit with adjustments to other glass components, without compromising the melting or forming characteristics of the glass composition. In those cases where the glasses, according to some embodiments, further include such other oxide(s), each of such other oxides are typically present in an amount not exceeding about 3 mol %, about 2 mol %, about 1 mol %, about 0.5 mol %, about 0.25 mol %, or about 0.1 mol %, and their total combined concentration is typically less than or equal to about 4 mol %, about 3 mol %, about 2 mol %, about 1 mol %, about 0.5 mol %, or about 0.25 mol %. In some circumstances, higher amounts can be used so long as the amounts used do not place the composition outside of the ranges described above. The glasses, according to some embodiments, can also include various contaminants associated with batch materials and/or introduced into the glass by the melting, fining, and/or forming equipment used to produce the glass (e.g., $ZrO_2$).

Table 1 show exemplary glasses along with glass properties. Efforts have been made to ensure accuracy with respect to numbers (e.g., amounts, temperature, etc.) but some errors and deviations should be accounted for. Unless indicated otherwise, temperature is in ° C. or is at ambient temperature, and pressure is at or near atmospheric. The compositions themselves are given in mole percent on an oxide basis and have been normalized to 100%. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

The glass properties set forth in the Table 1 were determined in accordance with techniques conventional in the glass art. Thus, $T_{str}$(° C.) is the strain point which is the temperature when the viscosity is equal to $10^{14.7}$ P as measured by beam bending or fiber elongation. The linear coefficient of thermal expansion (CTE) was done using ASTM E228-85 over the temperature range 25-300° C. is expressed in terms of $\times 10^{-7}$/° C. The annealing point is expressed in terms of C and was determined from fiber elongation techniques (ASTM C336). The density in terms of grams/cm$^3$ was measured via the Archimedes method (ASTM C693). The melting temperature in terms of ° C. (defined as the temperature at which the glass melt demonstrates a viscosity of 400 poises) was calculated employing a Fulcher equation fit to high temperature viscosity data measured via rotating cylinders viscometry (ASTM C965-81).

$T_{liq}$(° C.) is the liquidus temperature—the temperature where the first crystal is observed in a standard gradient boat liquidus measurement (ASTM C829-81). This involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. More particularly, the glass sample is removed from the Pt boat in one piece, and examined using polarized light microscopy to identify the location and nature of crystals which have formed against the Pt and air interfaces, and in the interior of the sample. Because the gradient of the furnace is very well known, temperature vs. location can be well estimated, within 5-10° C. The temperature at which crystals are observed in the internal portion of the sample is taken to represent the liquidus of the glass (for the corresponding test period). Testing is sometimes carried out at longer times (e.g. 72 hours), in order to observe slower growing phases. The liquidus viscosity in poises was determined from the liquidus temperature and the coefficients of the Fulcher equation.

The temperature at which the zircon in a zircon isopipe breaks down to form zirconia and silica is referred to herein as the "breakdown temperature" or "$T^{breakdown}$". If this temperature is higher than any temperature seen on the isopipe, the problem of zirconia inclusions in fusion-drawn glass (also referred to as "fusion line zirconia") would not occur. Because fusion is essentially an isoviscous process, the highest temperature seen by the glass corresponds to a particular viscosity of the glass. In those standard fusion-draw operations known in the art, this viscosity is about 35,000 poise ("35 kpoise" or "35 kp"), although the viscosity can be as low as about 16,000 poise during brief periods when an isopipe is being initially wet by glass. We define the difference between the breakdown temperature and the temperature corresponding to 35,000 poise viscosity as the breakdown margin $T^{margin}$, where:

$$T^{margin} = T^{breakdown} - T^{35kp}$$

where $T^{35kp}$ is the temperature at which the viscosity of the glass is 35,000 poise.

When the breakdown margin $T^{margin}$ is negative, zircon will breakdown to form zirconia defects at some location on the isopipe. When $T^{margin}$ is zero, it is still possible that temperature excursions could cause zircon breakdown to occur. It is therefore desirable not only to make the breakdown margin positive, but to maximize $T^{margin}$ as much as possible while being consistent with all the other attributes that must be maintained in the final glass product.

Sodium and potassium release rates were determined by a buffered aqueous test, described below. The calculated sodium release ("Na release model" in Table 1) was based on an internal model where weights are given to various chemical components representative of theoretical glass structural units that could aid or inhibit the release of sodium from the glass.

TABLE 1

| | Glass Number | | | | | | | |
|---|---|---|---|---|---|---|---|---|
| | 1 | 2 | 3 | 4 | 5 | 6 | 7 | 8 |
| $SiO_2$ | 69.5 | 71.98 | 68.88 | 69.92 | 70.45 | 69.88 | 73.81 | 67.81 |
| $Al_2O_3$ | 9.76 | 8.41 | 8.85 | 8.94 | 10.39 | 8.93 | 6.61 | 8.75 |
| $B_2O_3$ | 0 | 0.54 | 0 | 0 | 1.17 | 0 | 0.48 | 0 |
| $Na_2O$ | 9.8 | 5.56 | 8.93 | 9.26 | 9.34 | 7.31 | 3.7 | 6.45 |
| $K_2O$ | 0.01 | 4.51 | 3.74 | 1.9 | 1 | 3.79 | 6.41 | 3.71 |
| MgO | 6.83 | 4.04 | 8.33 | 4.88 | 3.19 | 4.95 | 4.46 | 6.31 |
| CaO | 3.93 | 3.46 | 1.05 | 4.9 | 3.32 | 4.94 | 3.1 | 6.86 |
| SrO | 0 | 1.37 | 0 | 0 | 1.03 | 0 | 1.31 | 0 |
| BaO | 0 | 0.02 | 0 | 0 | 0.01 | 0 | 0 | 0 |
| ZnO | 0 | 0 | 0 | 0 | 0 | 0 | 0 | 0 |
| $SnO_2$ | 0.18 | 0.09 | 0.2 | 0.19 | 0.1 | 0.2 | 0.1 | 0.1 |
| $Fe_2O_3$ | 0.01 | 0.01 | 0.01 | 0.01 | 0.01 | 0.01 | 0.01 | 0.01 |
| $ZrO_2$ | | | | | | | | |
| Total $R_2O$ | 9.81 | 10.07 | 12.67 | 11.16 | 10.34 | 11.1 | 10.11 | 10.16 |
| $T_{Brkdwn}$ | 1284 | 1276 | 1224 | 1240 | 1273 | 1221 | 1306 | 1193 |
| $T_{Brkwn} - T_{35k}$ | 80 | 56 | 3 | 58 | 46 | 24 | 86 | 37 |
| Na release, buffered aqueous test | 27.5 | 17.5 | 30.5 | 25.5 | 21 | 21 | 16 | 16.5 |
| K release, buffered aqueous test | 0 | 6.2 | 5.2 | 1.9 | 0.5 | 4.8 | 16 | 4.7 |
| (Na + K), buffered aqueous test | 27.5 | 23.7 | 35.7 | 27.4 | 21.5 | 25.8 | 32 | 21.2 |
| Na release model | 23.9 | 15.1 | 33.1 | 31.9 | 21.8 | 23.8 | 12.6 | 20.6 |
| Strain Pt. [° C.] | 635 | | 605 | 601 | 604.4 | 606 | 592.6 | 616 |
| CTE [×$10^{-7}$] | 64.9 | | 78.5 | 74.2 | 68.1 | 76.8 | 72.9 | 75.5 |
| Density [g/cc] | 2.462 | | 2.439 | 2.464 | 2.451 | 2.46 | 2.444 | 2.487 |
| $T_{400}$ [° C.] | 1573 | 1636 | 1604 | 1560 | 1618 | 1584 | 1649 | 1521 |
| $T_{35000}$ [° C.] | 1204 | 1223 | 1221 | 1182 | 1227 | 1197 | 1230 | 1156 |
| $T_{liq}$ [° C.] | | 1135 | | | | | 1120 | |
| Liquidus Viscosity [kP] | | 152 | | | | | 216 | |

| | 9 | 10 | 11 | 12 | 13 | 14 | 15 | 16 |
|---|---|---|---|---|---|---|---|---|
| $SiO_2$ | 67.69 | 75 | 71.25 | 70.73 | 70.62 | 71.33 | 70.63 | 72.68 |
| $Al_2O_3$ | 10.02 | 4.78 | 8.67 | 9 | 9.32 | 9.44 | 9.72 | 8.06 |
| $B_2O_3$ | 0 | 0.28 | 0 | 0 | 0 | 0 | 0 | 0 |
| $Na_2O$ | 9.99 | 1.77 | 5.15 | 8.13 | 8.89 | 10.22 | 9.38 | 7.81 |
| $K_2O$ | 1.41 | 8.37 | 4.86 | 3.01 | 2.63 | 2.04 | 2.46 | 3.12 |
| MgO | 4.35 | 4.41 | 5.21 | 4.96 | 4.32 | 3.52 | 3.9 | 5.48 |
| CaO | 6.44 | 3.75 | 4.77 | 4.06 | 4.12 | 3.34 | 3.79 | 2.75 |
| SrO | 0 | 1.55 | 0 | 0 | 0 | 0 | 0 | 0 |
| BaO | 0 | 0.02 | 0 | 0 | 0 | 0 | 0 | 0 |
| ZnO | 0 | 0 | 0 | 0 | 0 | 0 | 0 | 0 |

TABLE 1-continued

| | | | | Glass Number | | | | |
|---|---|---|---|---|---|---|---|---|
| SnO$_2$ | 0.1 | 0.098 | 0.1 | 0.1 | 0.1 | 0.1 | 0.1 | 0.1 |
| Fe$_2$O$_3$ | 0.01 | 0.01 | 0.01 | 0.01 | 0.01 | 0.01 | 0.01 | 0.01 |
| ZrO$_2$ | | | | | | | | |
| Total R$_2$O | 11.4 | 10.7 | 10.01 | 11.14 | 11.52 | 12.26 | 11.84 | 10.93 |
| T$_{Brkdwn}$ | 1177.16 | 1316 | 1256.32 | 1248.15 | 1237.48 | 1244.65 | 1231.84 | 1304.21 |
| T$_{Brkwn}$-T$_{35k}$ | 19.168 | 103 | 18.32 | 37.159 | 29.486 | 31.655 | 17.84 | 70.219 |
| Na release, buffered aqueous test | 33.5 | 10.5 | 17 | 31.5 | 33 | 34 | 36 | 26.5 |
| K release, buffered aqueous test | 1.5 | 48.9 | 7 | 3.95 | 3.05 | 1.7 | 2.8 | 3.65 |
| (Na + K), buffered aqueous test | 35 | 59.4 | 24 | 35.45 | 36.05 | 35.7 | 38.8 | 30.15 |
| Na release model | 34.0491 | 11.5731 | 13.4664 | 25.7696 | 29.0242 | 35.9184 | 30.1668 | 25.2809 |
| Strain Pt. [° C.] | 608 | 587 | 627 | 608 | 604 | 592.9 | 605 | 614 |
| CTE [×10$^{-7}$] | 75.6 | 74 | 72.2 | 74.8 | 75.8 | 76.5 | 75.9 | 72.3 |
| Density [g/cc] | 2.483 | 2.446 | 2.446 | 2.446 | 2.448 | 2.439 | 2.446 | 2.427 |
| T$_{400}$ [° C.] | 1530 | 1613 | 1631 | 1608 | 1605 | 1624 | 1617 | 1640 |
| T$_{35000}$ [° C.] | 1158 | 1213 | 1238 | 1211 | 1208 | 1213 | 1214 | 1234 |
| T$_{liq}$ [° C.] | | 1010 | | | | | | |
| Liquidus Viscosity [kP] | | 1750 | | | | | | |

| | 17 | 18 | 19 | 20 | 21 | 22 | 23 | 24 |
|---|---|---|---|---|---|---|---|---|
| SiO$_2$ | 70.05 | 70.68 | 68.54 | 71.51 | 69.31 | 71.47 | 68.45 | 72.77 |
| Al$_2$O$_3$ | 9.51 | 8.62 | 9 | 9.5 | 9.43 | 8.75 | 9.46 | 8.73 |
| B$_2$O$_3$ | 0 | 0 | 0 | 0 | 0 | 0 | 0 | 0 |
| Na$_2$O | 8.75 | 6.62 | 8.12 | 8.25 | 9.96 | 9.35 | 9.09 | 8.78 |
| K$_2$O | 2.16 | 4.72 | 3.5 | 2.74 | 2.45 | 3.2 | 2.55 | 2.45 |
| MgO | 3.87 | 5.8 | 6.06 | 2.55 | 5.77 | 5.18 | 5.3 | 3.73 |
| CaO | 5.55 | 3.45 | 4.67 | 5.34 | 2.96 | 1.95 | 5.04 | 3.42 |
| SrO | 0 | 0 | 0 | 0 | 0 | 0 | 0 | 0 |
| BaO | 0 | 0 | 0 | 0 | 0 | 0 | 0 | 0 |
| ZnO | 0 | 0 | 0 | 0 | 0 | 0 | 0 | 0 |
| SnO$_2$ | 0.1 | 0.1 | 0.1 | 0.1 | 0.1 | 0.1 | 0.1 | 0.1 |
| Fe$_2$O$_3$ | 0.01 | 0.01 | 0.01 | 0.01 | 0.01 | 0.01 | 0.01 | 0.01 |
| ZrO$_2$ | | | | | | | | |
| Total R$_2$O | 10.91 | 11.34 | 11.62 | 10.99 | 12.41 | 12.55 | 11.64 | 11.23 |
| T$_{Brkdwn}$ (calc) | 1228.33 | 1238.29 | 1196.84 | 1242.55 | 1215.96 | 1253.87 | 1194.57 | 1289.47 |
| T$_{Brkwn}$-T$_{35k}$ | 33.332 | 15.296 | 18.849 | 22.555 | 19.969 | 36.877 | 25.577 | 57.476 |
| Na release, buffered aqueous test | 29 | 25.5 | 27.5 | 27 | 37 | 35.5 | 31.5 | 32.5 |
| K release, buffered aqueous test | 2.2 | 7.5 | 4.9 | 3 | 2.8 | 3.9 | 3.2 | 2.8 |
| (Na + K), buffered aqueous test | 31.2 | 33 | 32.4 | 30 | 39.8 | 39.4 | 34.7 | 35.3 |
| Na release model | 27.1152 | 21.3987 | 28.9483 | 24.6973 | 36.0443 | 34.7817 | 31.7235 | 28.2096 |
| Strain Pt. [° C.] | 610 | 606 | 601 | 611 | 597 | 590.3 | 601 | 599 |
| CTE [×10$^{-7}$] | 73.9 | 76.8 | 78.1 | 74.4 | 78.2 | 78.4 | 78.1 | 74.2 |
| Density [g/cc] | 2.459 | 2.443 | 2.46 | 2.447 | 2.452 | 2.431 | 2.472 | 2.43 |

TABLE 1-continued

| | Glass Number | | | | | | | |
|---|---|---|---|---|---|---|---|---|
| $T_{400}$ [° C.] | 1587 | 1617 | 1554 | 1630 | 1582 | 1625 | 1543 | 1647 |
| $T_{35000}$ [° C.] | 1195 | 1223 | 1178 | 1220 | 1196 | 1217 | 1169 | 1232 |
| $T_{liq}$ [° C.] | | | | | | | | |
| Liquidus Viscosity [kP] | | | | | | | | |

| | 25 | 26 | 27 | 28 | 29 | 30 | 31 | 32 |
|---|---|---|---|---|---|---|---|---|
| $SiO_2$ | 70.81 | 71.02 | 70.75 | 71.11 | 71.17 | 71.41 | 68.52 | 71.73 |
| $Al_2O_3$ | 9.53 | 9.64 | 8.83 | 9.36 | 8.65 | 8.77 | 10.61 | 8.96 |
| $B_2O_3$ | 0 | 0 | 0 | 0 | 0 | 0 | 0.39 | 0 |
| $Na_2O$ | 9.62 | 10.36 | 5.84 | 10.36 | 8.82 | 8.83 | 11.69 | 10.05 |
| $K_2O$ | 2.62 | 2.04 | 4.4 | 2.07 | 3.8 | 3.54 | 0.39 | 2.65 |
| MgO | 3.69 | 4.28 | 4.64 | 4.92 | 7.18 | 5.28 | 5.55 | 4.55 |
| CaO | 3.63 | 2.55 | 5.45 | 2.08 | 0.27 | 2.06 | 1.3 | 1.95 |
| SrO | 0 | 0 | 0 | 0 | 0 | 0 | 0.28 | 0 |
| BaO | 0 | 0 | 0 | 0 | 0 | 0 | 1.17 | 0 |
| ZnO | 0 | 0 | 0 | 0 | 0 | 0 | 0 | 0 |
| $SnO_2$ | 0.1 | 0.1 | 0.1 | 0.1 | 0.1 | 0.1 | 0.1 | 0.1 |
| $Fe_2O_3$ | 0.01 | 0.01 | 0.01 | 0.01 | 0.01 | 0.01 | 0.01 | 0.01 |
| $ZrO_2$ | | | | | | | | |
| Total $R_2O$ | 12.24 | 12.4 | 10.24 | 12.43 | 12.62 | 12.37 | 12.08 | 12.7 |
| $T_{Brkdwn}$ (calc) | 1227.83 | 1244.88 | 1239.06 | 1254.08 | 1264.48 | 1252.21 | 1254.85 | 1257.03 |
| $T_{Brkwn}-T_{35k}$ | 21.836 | 22.88 | 28.063 | 42.087 | 24.488 | 31.215 | 40.853 | 45.032 |
| Na release, buffered aqueous test | 35 | 33.5 | 19 | 34.5 | 34.5 | 34 | 36.5 | 37.5 |
| K release, buffered aqueous test | 3.05 | 1.65 | 5.8 | 1.65 | 5 | 4.75 | 0.16 | 3.2 |
| (Na + K), buffered aqueous test | 38.05 | 35.15 | 24.8 | 36.15 | 39.5 | 38.75 | 36.66 | 40.7 |
| Na release model | 33.4224 | 35.3537 | 16.4335 | 36.2313 | 31.4397 | 31.8154 | 32.9088 | 37.4999 |
| Strain Pt. [° C.] | 597 | 600.6 | 621 | 597.9 | 606 | 592.2 | 607 | 585.5 |
| CTE [×$10^{-7}$] | 78.2 | 76.9 | 73.9 | 76.8 | 78.5 | 78.4 | 72.3 | 77.9 |
| Density [g/cc] | 2.445 | 2.436 | 2.454 | 2.432 | 2.422 | 2.431 | 2.473 | 2.429 |
| $T_{400}$ [° C.] | 1612 | 1624 | 1602 | 1616 | 1637 | 1631 | 1606 | 1622 |
| $T_{35000}$ [° C.] | 1206 | 1222 | 1211 | 1212 | 1240 | 1221 | 1214 | 1212 |
| $T_{liq}$ [° C.] | | | | | | | | |
| Liquidus Viscosity [kP] | | | | | | | | |

| | 33 | 34 | 35 | 36 | 37 | 38 | 39 | 40 |
|---|---|---|---|---|---|---|---|---|
| $SiO_2$ | 71.45 | 69.64 | 71.8 | 70.97 | 70.32 | 72.08 | 69.13 | 68.24 |
| $Al_2O_3$ | 9.17 | 10.55 | 9.26 | 9.46 | 9.56 | 8.47 | 10.37 | 10.25 |
| $B_2O_3$ | 0 | 2.35 | 0 | 0 | 0 | 0 | 1.06 | 1.98 |
| $Na_2O$ | 9.77 | 7.3 | 10.56 | 10.19 | 11.1 | 9.67 | 11.6 | 11.7 |
| $K_2O$ | 3.01 | 1.12 | 2.09 | 2.21 | 1.91 | 2.45 | 0.38 | 0.38 |
| MgO | 4.32 | 2.96 | 3.32 | 3.84 | 4.7 | 5.15 | 4.82 | 4.86 |
| CaO | 2.17 | 4.97 | 2.85 | 3.22 | 2.3 | 2.06 | 1.2 | 1.23 |
| SrO | 0 | 1 | 0 | 0 | 0 | 0 | 1.31 | 1.25 |
| BaO | 0 | 0 | 0 | 0 | 0 | 0 | 0.02 | 0.02 |
| ZnO | 0 | 0 | 0 | 0 | 0 | 0 | 0 | 0 |
| $SnO_2$ | 0.1 | 0.1 | 0.1 | 0.1 | 0.1 | 0.1 | 0.1 | 0.1 |
| $Fe_2O_3$ | 0.01 | 0.01 | 0.01 | 0.01 | 0.01 | 0.01 | 0.01 | 0.01 |
| $ZrO_2$ | | | | | | | | |
| Total $R_2O$ | 12.78 | 8.42 | 12.65 | 12.4 | 13.01 | 12.12 | 11.98 | 12.08 |
| $T_{Brkdwn}$ (calc) | 1242.87 | 1292.96 | 1250.05 | 1236.47 | 1227.75 | 1280.86 | 1248.2 | 1244.92 |
| $T_{Brkwn}-T_{35k}$ | 31.879 | 79.964 | 43.053 | 28.47 | 20.752 | 63.862 | 48.2 | 51.929 |
| Na release, buffered aqueous test | 36.5 | 22.5 | 37.5 | 35 | 39.5 | 37.5 | 37 | 35.5 |

TABLE 1-continued

| | Glass Number | | | | | | | |
|---|---|---|---|---|---|---|---|---|
| K release, buffered aqueous test | 3.7 | 2.9 | 2.15 | 2.3 | 1.9 | 2.75 | 0.155 | 0.16 |
| (Na + K), buffered aqueous test | 40.2 | 25.4 | 39.65 | 37.3 | 41.4 | 40.25 | 37.155 | 35.66 |
| Na release model | 35.9983 | 14.8607 | 38.8479 | 36.3518 | 42.0045 | 35.5109 | 33.9387 | 34.0553 |
| Strain Pt. [° C.] | 583.6 | 603.8 | 585.9 | 591.8 | 591.2 | 592.1 | 611 | 590 |
| CTE [×10$^{-7}$] | 79.4 | 62.4 | 77.5 | 77.5 | 78.4 | 75.4 | 71.8 | 72 |
| Density [g/cc] | 2.432 | 2.452 | 2.433 | 2.433 | 2.438 | 2.428 | 2.455 | 2.449 |
| T$_{400}$ [° C.] | 1624 | 1596 | 1624 | 1614 | 1611 | 1625 | 1595 | 1594 |
| T$_{35000}$ [° C.] | 1211 | 1213 | 1207 | 1208 | 1207 | 1217 | 1200 | 1193 |
| T$_{liq}$ [° C.] | | | | | | | | |
| Liquidus Viscosity [kP] | | | | | | | | |

| | 41 | 42 | 43 | 44 | 45 | 46 | 47 | 48 |
|---|---|---|---|---|---|---|---|---|
| SiO$_2$ | 68.18 | 70.63 | 69.64 | 68.43 | 68.2 | 69.85 | 71.34 | 69.39 |
| Al$_2$O$_3$ | 10.27 | 9.42 | 9.26 | 11.16 | 10.24 | 8.93 | 10.07 | 10.8 |
| B$_2$O$_3$ | 2.93 | 0.99 | 2.81 | 0 | 5.25 | 0 | 0.28 | 0 |
| Na$_2$O | 11.56 | 10.36 | 10.21 | 12.71 | 7.61 | 6.84 | 10.71 | 10.46 |
| K$_2$O | 0.38 | 1.48 | 1.51 | 0.01 | 0.02 | 3.81 | 0.98 | 1.83 |
| MgO | 4.43 | 4.72 | 4.34 | 3.62 | 4.97 | 7.41 | 4.01 | 3.54 |
| CaO | 1.13 | 1.08 | 1.09 | 1.96 | 1.75 | 2.96 | 1.75 | 1.9 |
| SrO | 1 | 1.2 | 1.02 | 0.01 | 1.84 | 0 | 0.74 | 0.01 |
| BaO | 0.02 | 0.02 | 0.02 | 0 | 0.03 | 0 | 0.01 | 0 |
| ZnO | 0 | 0 | 0 | 2 | 0 | 0 | 0 | 1.97 |
| SnO$_2$ | 0.1 | 0.1 | 0.1 | 0.1 | 0.09 | 0.2 | 0.1 | 0.1 |
| Fe$_2$O$_3$ | 0.01 | 0.01 | 0.01 | 0.01 | 0.01 | 0.01 | 0.01 | 0.01 |
| ZrO$_2$ | | | | | | | | |
| Total R$_2$O | 11.94 | 11.84 | 11.72 | 12.72 | 7.63 | 10.65 | 11.69 | 12.29 |
| T$_{Brkdwn}$ (calc) | 1260.64 | 1273.27 | 1284.43 | 1239.09 | 1363.63 | 1255.04 | 1273.47 | 1247.66 |
| T$_{Brkwn}$-T$_{35k}$ | 94.643 | 52.277 | 113.431 | 26.092 | 171.637 | 33.045 | 34.477 | 10.664 |
| Na release, buffered aqueous test | 33 | 31 | 26.5 | 37.5 | 13 | 19 | 25.5 | 25 |
| K release, buffered aqueous test | 0.11 | 1 | 1.05 | 0 | 0 | 4.44159 | 0.385 | 1.05 |
| (Na + K), buffered aqueous test | 33.11 | 32 | 27.55 | 37.5 | 13 | 23.4415 | 25.885 | 26.05 |
| Na release model | 30.2004 | 32.2681 | 28.8426 | 33.6112 | 13.2941 | 19.0003 | 30.8036 | 25.0000 |
| Strain Pt. [° C.] | 580 | 595 | 577 | 617.8 | | 622 | 609.1 | 616.5 |
| CTE [×10$^{-7}$] | 71.6 | 73.1 | 72.9 | 73.2 | | 73.3 | 72.2 | 74.8 |
| Density [g/cc] | 2.444 | 2.444 | 2.439 | 2.477 | | 2.45 | 2.438 | 2.469 |
| T$_{400}$ [° C.] | 1555 | 1621 | 1582 | 1593 | 1560 | 1599 | 1642 | 1628 |
| T$_{35000}$ [° C.] | 1166 | 1221 | 1171 | 1213 | 1187 | 1222 | 1239 | 1237 |
| T$_{liq}$ [° C.] | 1040 | 1030 | 1000 | | 1100 | | | |
| Liquidus Viscosity [kP] | 352 | 1153 | 809 | | 167 | | | |

| | 49 | 50 | 51 | 52 | 53 | 54 | 55 | 56 |
|---|---|---|---|---|---|---|---|---|
| SiO$_2$ | 69.6 | 73.48 | 69.46 | 70.35 | 69.51 | 73.03 | 72.44 | 71.15 |
| Al$_2$O$_3$ | 10.82 | 7.28 | 8.9 | 9.21 | 10.81 | 8.27 | 9.07 | 9.31 |
| B$_2$O$_3$ | 0 | 0 | 0 | 0 | 0 | 0 | 0 | 1.12 |
| Na$_2$O | 10.48 | 6.09 | 8.83 | 7 | 12.32 | 9 | 9.13 | 10.17 |
| K$_2$O | 1.84 | 5.3 | 1.9 | 3.57 | 0.03 | 3.21 | 2.68 | 1.42 |
| MgO | 2.46 | 2.55 | 7.68 | 4 | 2.5 | 3.57 | 1.78 | 4.19 |
| CaO | 1.75 | 4.68 | 3.01 | 5.77 | 1.76 | 2.5 | 4.53 | 1.14 |
| SrO | 1 | 0.52 | 0 | 0 | 1 | 0.32 | 0.26 | 1.31 |

TABLE 1-continued

| | Glass Number | | | | | | | |
|---|---|---|---|---|---|---|---|---|
| BaO | 0 | 0 | 0 | 0 | 0 | 0 | 0 | 0.02 |
| ZnO | 1.94 | 0 | 0 | 0 | 1.96 | 0 | 0 | 0.18 |
| $SnO_2$ | 0.1 | 0.1 | 0.2 | 0.1 | 0.1 | 0.1 | 0.1 | 0.01 |
| $Fe_2O_3$ | 0.01 | 0.01 | 0.01 | 0.01 | 0.01 | 0.01 | 0.01 | 0 |
| $ZrO_2$ | | | | | | | | |
| Total $R_2O$ | 12.32 | 11.39 | 10.73 | 10.57 | 12.35 | 12.21 | 11.81 | 11.59 |
| $T_{Brkdwn}$ (calc) | 1238.82 | 1262.27 | 1267.07 | 1226.5 | 1255.11 | 1276.54 | 1249.21 | 1287.49 |
| $T_{Brkwn}-T_{35k}$ | 7.823 | 73.276 | 63.074 | 21.5 | 37.113 | 64.546 | 44.218 | 74.498 |
| Na release, buffered aqueous test | 24.5 | 19 | 23.5 | 21.5 | 32.5 | 23.5 | 22 | |
| K release, buffered aqueous test | 1.1 | 9.75 | 1.9 | 4 | 0 | 3.25 | 2.6 | |
| (Na + K), buffered aqueous test | 25.6 | 28.75 | 25.4 | 25.5 | 32.5 | 26.75 | 24.6 | 0 |
| Na release model | 26.402 | 19 | 26.7851 | 20.6180 | 33.1931 | 32.5022 | 27.6563 | 30.3216 |
| Strain Pt. [° C.] | 608.4 | 575.8 | 617 | 614 | 609.8 | 577.9 | 588.4 | 582 |
| CTE [×10$^{-7}$] | 75.6 | 77.3 | 71.3 | 74.1 | 72 | 77.6 | 76.5 | 72 |
| Density [g/cc] | 2.488 | 2.443 | 2.455 | 2.458 | 2.489 | 2.429 | 2.443 | 2.445 |
| $T_{400}$ [° C.] | 1635 | 1606 | 1578 | 1595 | 1610 | 1640 | 1627 | 1620 |
| $T_{35000}$ [° C.] | 1231 | 1189 | 1204 | 1205 | 1218 | 1212 | 1205 | 1213 |
| $T_{liq}$ [° C.] | | | | | | | | 1020 |
| Liquidus Viscosity [kP] | | | | | | | | 1243 |

| | 57 | 58 | 59 | 60 | 61 | 62 | 63 | 64 |
|---|---|---|---|---|---|---|---|---|
| $SiO_2$ | 70.71 | 70.68 | 70.53 | 70.82 | 70.51 | 71.07 | 71.1 | 73.52 |
| $Al_2O_3$ | 8.87 | 8.89 | 9.14 | 10.3 | 9.87 | 9.46 | 9.11 | 7.97 |
| $B_2O_3$ | 1.1 | 1.19 | 1.11 | 0 | 0 | 0.98 | 1.1 | 0 |
| $Na_2O$ | 10.49 | 10.47 | 10.42 | 11.56 | 10.69 | 9.31 | 10.35 | 6.23 |
| $K_2O$ | 1.22 | 1.18 | 1.17 | 0.95 | 2.18 | 1.38 | 1.47 | 4.89 |
| MgO | 4.8 | 4.79 | 5.06 | 3.4 | 3.99 | 4.69 | 4.29 | 3.69 |
| CaO | 0.8 | 1.17 | 1.12 | 1.84 | 2.65 | 0.82 | 0.72 | 3.06 |
| SrO | 1.8 | 1.41 | 1.25 | 1.01 | 0 | 2.18 | 1.66 | 0.52 |
| BaO | 0.02 | 0.02 | 0.02 | 0 | 0 | 0.01 | 0.02 | 0.01 |
| ZnO | 0.18 | 0.18 | 0.17 | 0 | 0 | 0 | 0.18 | 0 |
| $SnO_2$ | 0.01 | 0.01 | 0.01 | 0.1 | 0.1 | 0.1 | 0.01 | 0.1 |
| $Fe_2O_3$ | 0 | 0 | 0 | 0.01 | 0.01 | 0.01 | 0 | 0.01 |
| $ZrO_2$ | | | | | | | | |
| Total $R_2O$ | 11.71 | 11.65 | 11.59 | 12.51 | 12.87 | 10.69 | 11.82 | 11.12 |
| $T_{Brkdwn}$ (calc) | 1284.6 | 1286.92 | 1284.94 | 1239.19 | 1222.61 | 1295.56 | 1284.51 | 1284.66 |
| $T_{Brkwn}-T_{35k}$ | 99.6 | 100.928 | 90.943 | 11.195 | 8.619 | 71.568 | 80.511 | 47.668 |
| Na release, buffered aqueous test | | | | 34 | 38 | 24 | | 21.5 |
| K release, buffered aqueous test | | | | 0.05 | 2.2 | 0.935 | | 7.2 |
| (Na + K), buffered aqueous test | 0 | 0 | 0 | 34.05 | 40.2 | 24.935 | 0 | 28.7 |
| Na release model | 34.8907 | 34.1431 | 32.3765 | 38.3988 | 38.2147 | 24.2047 | 33.0989 | 20.5134 |
| Strain Pt. [° C.] | 575 | 577 | 582 | 603.9 | 593.7 | 593.7 | 578 | 594.5 |
| CTE [×10$^{-7}$] | 73.5 | 73.3 | 73.1 | 75.4 | 77.3 | 70.1 | 73.2 | 75.2 |
| Density [g/cc] | 2.46 | 2.453 | 2.451 | 2.452 | 2.439 | 2.46 | 2.449 | 2.432 |
| $T_{400}$ [° C.] | 1577 | 1586 | 1581 | 1637 | 1619 | 1626 | 1618 | 1663 |
| $T_{35000}$ [° C.] | 1185 | 1186 | 1194 | 1228 | 1214 | 1224 | 1204 | 1237 |
| $T_{liq}$ [° C.] | 1010 | 1020 | 1050 | 1045 | | 1065 | 1000 | 1110 |

TABLE 1-continued

| | Glass Number | | | | | | | |
|---|---|---|---|---|---|---|---|---|
| Liquidus Viscosity [kP] | 955 | 775 | 489 | 1069 | | 637 | 1647 | 296 |

| | 65 | 66 | 67 | 68 | 69 | 70 | 71 | 72 |
|---|---|---|---|---|---|---|---|---|
| $SiO_2$ | 69.17 | 68.1 | 68.24 | 68.4 | 70.01 | 70.76 | 72.91 | 71.88 |
| $Al_2O_3$ | 9.81 | 10.17 | 10.22 | 11.18 | 10.66 | 9.77 | 8.34 | 9.32 |
| $B_2O_3$ | 4.54 | 5.36 | 5.35 | 0 | 1.1 | 0.62 | 0.58 | 0.91 |
| $Na_2O$ | 6.91 | 7.5 | 7.53 | 10.82 | 10.45 | 10.45 | 7 | 7.94 |
| $K_2O$ | 0.71 | 0.02 | 0.01 | 1.89 | 0.3 | 1.4 | 3.33 | 2.05 |
| MgO | 4.76 | 4.93 | 4.95 | 3.63 | 4.41 | 4.39 | 3.81 | 3.97 |
| CaO | 3.36 | 3.79 | 1.75 | 1.97 | 1.24 | 1.41 | 2.69 | 2.2 |
| SrO | 0.62 | 0.01 | 1.85 | 0.01 | 1.71 | 1.08 | 1.23 | 1.61 |
| BaO | 0.01 | 0.01 | 0 | 0 | 0.01 | 0 | 0.01 | 0.01 |
| ZnO | 0 | 0 | 0 | 2 | 0 | 0 | 0 | 0 |
| $SnO_2$ | 0.1 | 0.1 | 0.1 | 0.1 | 0.1 | 0.1 | 0.1 | 0.1 |
| $Fe_2O_3$ | 0.01 | 0.01 | 0.01 | 0.01 | 0.01 | 0.01 | 0.01 | 0.01 |
| $ZrO_2$ | | | | | | | | |
| Total $R_2O$ | 7.62 | 7.52 | 7.54 | 12.71 | 10.75 | 11.85 | 10.33 | 9.99 |
| $T_{Brkdwn}$ (calc) | 1363.1 | 1364.06 | 1367.05 | 1220.00 | 1278.70 | 1265.18 | 1306.30 | 1305.96 |
| $T_{Brkwn}$-$T_{35k}$ | 164.1 | 175.066 | 174.051 | -9.993 | 48.709 | 51.18 | 74.308 | 67.96 |
| Na release, buffered aqueous test | 12 | 13 | 13 | 27 | 24.5 | 28 | 18 | 17 |
| K release, buffered aqueous test | 0.375 | 0 | 0 | 1.35 | 0 | 0.99 | 3.4 | 1.4 |
| (Na + K), buffered aqueous test | 12.375 | 13 | 13 | 28.35 | 24.5 | 28.99 | 21.4 | 18.4 |
| Na release model | 11.9999 | 12.8499 | 13.0160 | 26.7864 | 22.7156 | 31.7964 | 19.7849 | 18.1986 |
| Strain Pt. [° C.] | 592.8 | 588.7 | 589 | 613.1 | 606.1 | 590.8 | 591 | 600.4 |
| CTE [×10$^{-7}$] | 56.5 | 54.9 | 55.2 | 77.2 | 67.6 | 73.5 | 71.2 | 68.3 |
| Density [g/cc] | 2.418 | 2.406 | 2.431 | 2.477 | 2.456 | 2.448 | 2.443 | 2.45 |
| $T_{400}$ [° C.] | 1580 | 1557 | 1561 | 1616 | 1625 | 1620 | 1651 | 1645 |
| $T_{35000}$ [° C.] | 1199 | 1189 | 1193 | 1230 | 1230 | 1214 | 1232 | 1238 |
| $T_{liq}$ [° C.] | | | 1095 | | | 1060 | | |
| Liquidus Viscosity [kP] | | | 210 | | | 572 | | |

| | 73 | 74 | 75 | 76 | 77 | 78 | 79 | 80 |
|---|---|---|---|---|---|---|---|---|
| $SiO_2$ | 72.51 | 72.41 | 70.67 | 73.08 | 73.28 | 71.04 | 71.8 | 74.37 |
| $Al_2O_3$ | 8.61 | 9.06 | 10.08 | 7.6 | 8.21 | 9.48 | 9.22 | 5.13 |
| $B_2O_3$ | 0.53 | 0.95 | 0.67 | 0.44 | 0.25 | 0.95 | 1.28 | 0 |
| $Na_2O$ | 7.93 | 6.96 | 10.42 | 5.98 | 7.01 | 10.23 | 6.78 | 1.98 |
| $K_2O$ | 2.92 | 2.46 | 0.95 | 4.67 | 3.47 | 1.44 | 3.5 | 8.87 |
| MgO | 3.93 | 3.77 | 4.41 | 3.75 | 3.75 | 4.46 | 3.27 | 4.04 |
| CaO | 2.34 | 2.54 | 1.37 | 3.26 | 2.78 | 1.03 | 2.93 | 4.66 |
| SrO | 1.12 | 1.74 | 1.32 | 1.12 | 1.13 | 1.16 | 1.1 | 0.84 |
| BaO | 0.01 | 0.01 | 0 | 0 | 0 | 0.02 | 0.01 | 0.01 |
| ZnO | 0.01 | 0 | 0 | 0 | 0 | 0.18 | 0 | 0 |
| $SnO_2$ | 0.1 | 0.1 | 0.1 | 0.1 | 0.1 | 0.01 | 0.1 | 0.1 |
| $Fe_2O_3$ | 0.01 | 0.01 | 0.01 | 0 | 0.01 | 0 | 0.01 | 0.01 |
| $ZrO_2$ | | | | | | | | |
| Total $R_2O$ | 10.85 | 9.42 | 11.37 | 10.65 | 10.48 | 11.67 | 10.28 | 10.85 |
| $T_{Brkdwn}$ (calc) | 1295.72 | 1318.85 | 1273.13 | 1289.99 | 1305.05 | 1283.89 | 1286.36 | 1272.54 |
| $T_{Brkwn}$-$T_{35k}$ | 72.727 | 75.855 | 45.137 | 80.995 | 78.056 | 63.892 | 54.366 | 72.541 |
| Na release, buffered aqueous test | 21 | 14.5 | 23 | | 14.5 | | 12 | 15.5 |
| K release, buffered aqueous test | 2.85 | 1.8 | 0.355 | | 2.85 | | 2.5 | 65.5 |

TABLE 1-continued

| | | | | Glass Number | | | | |
|---|---|---|---|---|---|---|---|---|
| (Na + K), buffered aqueous test | 23.85 | 16.3 | 23.355 | | 17.35 | 0 | 14.5 | 81 |
| Na release model | 23.63 | 14.6331 | 28.2679 | 19.6994 | 20.9635 | 30.0774 | 15.6445 | 13.7654 |
| Strain Pt. [° C.] | 586.1 | 603.3 | 598.1 | 592 | 589 | 587 | 588.8 | 587 |
| CTE [×10⁻⁷] | 72.4 | 67.2 | 70.9 | 70.2 | 71.6 | 73.1 | 71.3 | 77.3 |
| Density [g/cc] | 2.443 | 2.45 | 2.45 | 2.439 | 2.442 | 2.443 | 2.442 | 2.441 |
| $T_{400}$ [° C.] | 1640 | 1658 | 1621 | 1628 | 1627 | 1626 | 1631 | 1586 |
| $T_{35000}$ [° C.] | 1223 | 1243 | 1228 | 1209 | 1227 | 1220 | 1232 | 1200 |
| $T_{liq}$ [° C.] | 1100 | | 1070 | 1140 | | 1020 | | 1040 |
| Liquidus Viscosity [kP] | 286 | | 569 | 106 | | 1474 | | 714 |

| | 81 | 82 | 83 | 84 | 85 | 86 | 87 | 88 |
|---|---|---|---|---|---|---|---|---|
| $SiO_2$ | 75.15 | 71.25 | 71.14 | 72.02 | 72.49 | 73.76 | 70.63 | 72.7 |
| $Al_2O_3$ | 4.76 | 7.73 | 9.9 | 10.07 | 9.15 | 6.23 | 10.29 | 8.65 |
| $B_2O_3$ | 0 | 0 | 0.52 | 0 | 0 | 0 | 1.04 | 0 |
| $Na_2O$ | 2.85 | 3.81 | 10.32 | 10.96 | 8.82 | 4 | 10.6 | 8.89 |
| $K_2O$ | 6.82 | 6.84 | 1.11 | 1 | 2.76 | 7.06 | 0.75 | 2.94 |
| MgO | 4.06 | 4 | 4.11 | 3.59 | 3.57 | 3.98 | 3.72 | 3.55 |
| CaO | 5.24 | 5.25 | 1.18 | 2.13 | 2.31 | 4.19 | 1.64 | 2.38 |
| SrO | 1.01 | 1 | 1.61 | 0.11 | 0.79 | 0.67 | 1.21 | 0.78 |
| BaO | 0.01 | 0.01 | 0 | 0.01 | 0 | 0.01 | 0 | 0.01 |
| ZnO | 0 | 0 | 0 | 0 | 0 | 0 | 0 | 0 |
| $SnO_2$ | 0.1 | 0.09 | 0.1 | 0.1 | 0.1 | 0.09 | 0.1 | 0.1 |
| $Fe_2O_3$ | 0.01 | 0.01 | 0.01 | 0.01 | 0.01 | 0.01 | 0.01 | 0.01 |
| $ZrO_2$ | | | | | | | | |
| Total $R_2O$ | 9.67 | 10.65 | 11.43 | 11.96 | 11.58 | 11.06 | 11.35 | 11.83 |
| $T_{Brkdwn}$ (calc) | 1323.906 | 1216.226 | 1275.823 | 1276.573 | 1273.913 | 1272.606 | 1274.285 | 1274.637 |
| $T_{Brkwn}$-$T_{35k}$ | 136.906 | 12.226 | 46.823 | 24.573 | 36.913 | 68.606 | 48.285 | 52.637 |
| Na release, buffered aqueous test | 16 | 15.5 | 29.5 | 29.5 | 27 | 23 | 28.5 | 27.5 |
| K release, buffered aqueous test | 30 | 17.5 | 0.785 | 0.385 | 2.8 | 28.5 | 0.49 | 3 |
| (Na + K), buffered aqueous test | 46 | 33 | 30.285 | 29.885 | 29.8 | 51.5 | 28.99 | 30.5 |
| Na release model | 16.00722 | 13.63051 | 29.28813 | 32.68946 | 27.93404 | 17.77568 | 27.26798 | 31.25866 |
| Strain Pt. [° C.] | 582 | 602 | 600 | 606.9 | 600.3 | 575 | 594.9 | 584.9 |
| CTE [×10⁻⁷] | 72.3 | 77.5 | 71.4 | 72.9 | 74.7 | 77.9 | 70.2 | 76.1 |
| Density [g/cc] | 2.446 | 2.468 | 2.454 | 2.422 | 2.44 | 2.44 | 2.448 | 2.44 |
| $T_{400}$ [° C.] | 1587 | 1595 | 1643 | 1660 | 1660 | 1607 | 1630 | 1640 |
| $T_{35000}$ [° C.] | 1187 | 1204 | 1231 | 1252 | 1236 | 1204 | 1229 | 1222 |
| $T_{liq}$ [° C.] | 1070 | 1135 | 1065 | 1100 | 1045 | 1065 | 1080 | |
| Liquidus Viscosity [kP] | 278 | 112 | 690 | 361 | 594 | 689 | 408 | |

| | 89 | 90 | 91 | 92 | 93 | 94 | 95 | 96 |
|---|---|---|---|---|---|---|---|---|
| $SiO_2$ | 72.66 | 71.56 | 71.17 | 70.99 | 75.35 | 74.69 | 75.59 | 75.38 |
| $Al_2O_3$ | 8.88 | 9.44 | 10.03 | 10.28 | 4.81 | 4.64 | 4.46 | 4.75 |
| $B_2O_3$ | 0 | 0.91 | 0.4 | 0.11 | 0.35 | 0.75 | 0.71 | 0.4 |
| $Na_2O$ | 8.82 | 9.05 | 10.69 | 11.36 | 1.84 | 1.86 | 1.79 | 1.84 |
| $K_2O$ | 2.87 | 1.43 | 1.05 | 0.93 | 8.55 | 9 | 8.66 | 8.5 |
| MgO | 3.54 | 4.73 | 3.82 | 3.49 | 4.59 | 5.5 | 5.37 | 4.72 |
| CaO | 2.35 | 0.56 | 1.33 | 1.65 | 3.29 | 1.95 | 1.87 | 3.14 |
| SrO | 0.77 | 2.19 | 1.39 | 1.08 | 1.11 | 1.49 | 1.43 | 1.16 |
| BaO | 0.01 | 0 | 0 | 0 | 0 | 0 | 0 | 0 |
| ZnO | 0 | 0 | 0 | 0 | 0 | 0 | 0 | 0 |
| $SnO_2$ | 0.1 | 0.1 | 0.1 | 0.1 | 0.08 | 0.1 | 0.1 | 0.1 |
| $Fe_2O_3$ | 0.01 | 0.01 | 0.01 | 0.01 | 0.01 | 0.01 | 0.01 | 0.01 |

TABLE 1-continued

| | Glass Number | | | | | | | |
|---|---|---|---|---|---|---|---|---|
| $ZrO_2$ | | | | | | | | |
| Total $R_2O$ | 11.69 | 10.48 | 11.74 | 12.29 | 10.39 | 10.86 | 10.45 | 10.34 |
| $T_{Brkdwn}$ (calc) | 1275.61 | 1308.92 | 1268.30 | 1249.06 | 1319.24 | 1313.78 | 1341.29 | 1323.64 |
| $T_{Brkwn}-T_{35k}$ | 45.613 | 73.928 | 38.301 | 20.065 | 94.241 | 86.789 | 105.292 | 97.648 |
| Na release, buffered aqueous test | 27.5 | | | | 12 | 12.5 | 11 | 12 |
| K release, buffered aqueous test | 3 | | | | 52 | 61 | 54.5 | 52.5 |
| (Na + K), buffered aqueous test | 30.5 | | | | 64 | 73.5 | 65.5 | 64.5 |
| Na release model | 29.4284 | 22.1893 | 31.5078 | 36.1077 | 11.9530 | 12.5120 | 11.6386 | 11.9188 |
| Strain Pt. [° C.] | 594.2 | 601.3 | | | 598.1 | 583.3 | 585.2 | 591.3 |
| CTE [×10$^{-7}$] | 75.9 | | | | 73.6 | | | |
| Density [g/cc] | 2.439 | | | | 2.433 | | | |
| $T_{400}$ [° C.] | 1653 | 1644 | 1640 | 1639 | 1621 | 1629 | 1644 | 1631 |
| $T_{35000}$ [° C.] | 1233 | 1235 | 1230 | 1229 | 1220 | 1227 | 1236 | 1226 |
| $T_{liq}$ [° C.] | 1080 | 1090 | 1070 | 1050 | 1020 | 965 | 960 | 1035 |
| Liquidus Viscosity [kP] | 506 | 466 | 639 | 964 | 1638 | 8757 | 11722 | 1336 |

| | 97 | 98 | 99 | 100 | 101 | 102 | 103 | 104 |
|---|---|---|---|---|---|---|---|---|
| $SiO_2$ | 76.34 | 71.13 | 69.38 | 70.88 | 71.82 | 73.12 | 71.44 | 71.72 |
| $Al_2O_3$ | 4.6 | 10.16 | 10.79 | 10.33 | 9.2 | 5.85 | 9.73 | 9.33 |
| $B_2O_3$ | 0.37 | 0.54 | 0 | 0.52 | 0.83 | 0 | 0.58 | 0.88 |
| $Na_2O$ | 1.78 | 10.74 | 12.3 | 11.04 | 7.7 | 1.89 | 9.75 | 8.36 |
| $K_2O$ | 8.14 | 0.97 | 0.03 | 0.83 | 2.36 | 8.66 | 1.75 | 1.92 |
| MgO | 4.52 | 3.61 | 3.51 | 3.57 | 4.48 | 4.16 | 3.67 | 3.98 |
| CaO | 3.04 | 1.61 | 1.9 | 1.62 | 1.55 | 5.21 | 1.98 | 1.02 |
| SrO | 1.1 | 1.12 | 0.01 | 1.1 | 1.95 | 1 | 0.99 | 2.67 |
| BaO | 0 | 0.01 | 0 | 0 | 0 | 0.01 | 0.01 | 0 |
| ZnO | 0 | 0 | 1.97 | 0 | 0 | 0 | 0 | 0 |
| $SnO_2$ | 0.1 | 0.1 | 0.1 | 0.1 | 0.1 | 0.1 | 0.1 | 0.1 |
| $Fe_2O_3$ | 0.01 | 0.01 | 0.01 | 0.01 | 0.01 | 0.01 | 0.01 | 0.01 |
| $ZrO_2$ | | | | | | | | |
| Total $R_2O$ | 9.92 | 11.71 | 12.33 | 11.87 | 10.06 | 10.55 | 11.5 | 10.28 |
| $T_{Brkdwn}$ (calc) | 1352.33 | 1268.91 | 1264.67 | 1261.31 | 1304.92 | 1247.58 | 1272.28 | 1299.88 |
| $T_{Brkwn}-T_{35k}$ | 116.333 | 37.913 | 36.671 | 31.314 | 68.924 | 43.587 | 43.283 | 69.887 |
| Na release, buffered aqueous test | 11 | 34 | 36.5 | | 20 | 12 | 28.5 | 21 |
| K release, buffered aqueous test | 46 | 0.7 | 0 | | 2.15 | 52 | 1.45 | 1.7 |
| (Na + K), buffered aqueous test | 57 | 34.7 | 36.5 | | 22.15 | 64 | 29.95 | 22.7 |
| Na release model | 11.0094 | 30.5895 | 31.5886 | 31.7687 | 18.0620 | 12.1463 | 28.0608 | 20.7227 |
| Strain Pt. [° C.] | 594 | 600 | 618.7 | 604.6 | 601.3 | 598 | 594.7 | 592.8 |
| CTE [×10$^{-7}$] | | 72.1 | 72 | | 68.9 | 77.2 | 72.1 | 70.1 |
| Density [g/cc] | | 2.446 | 2.469 | 2.449 | 2.457 | 2.454 | 2.444 | 2.47 |
| $T_{400}$ [° C.] | 1649 | 1643 | 1620 | 1640 | 1645 | 1604 | 1631 | 1638 |
| $T_{35000}$ [° C.] | 1236 | 1235 | 1228 | 1230 | 1240 | 1204 | 1231 | 1230 |
| $T_{liq}$ [° C.] | 1020 | 1050 | 1060 | 1070 | 1085 | 1075 | 1055 | |
| Liquidus Viscosity [kP] | 2268 | 1048 | | 787 | 745 | 319 | 575 | 856 |

TABLE 1-continued

| | \multicolumn{8}{c}{Glass Number} | | | | | | | |
|---|---|---|---|---|---|---|---|---|
| | 105 | 106 | 107 | 108 | 109 | 110 | 111 | 112 |
| $SiO_2$ | 71.38 | 73.58 | 73.19 | 72.92 | 69.46 | 72.95 | 70.64 | 73.34 |
| $Al_2O_3$ | 9.64 | 6.67 | 7.22 | 7.18 | 8.94 | 7.58 | 9.42 | 7.16 |
| $B_2O_3$ | 0.5 | 0.5 | 0.38 | 0.58 | 0 | 0.54 | 1 | 0.49 |
| $Na_2O$ | 4.94 | 3.44 | 5.42 | 5.41 | 10.84 | 5.97 | 6.36 | 5.39 |
| $K_2O$ | 4.52 | 6.56 | 5.35 | 5.5 | 1.91 | 4.75 | 4.48 | 5.3 |
| MgO | 3.22 | 4.55 | 3.8 | 4.21 | 7.66 | 3.96 | 3.72 | 3.99 |
| CaO | 2.22 | 3.23 | 3.46 | 2.85 | 0.99 | 2.95 | 2.08 | 3.06 |
| SrO | 3.46 | 1.35 | 1.08 | 1.25 | 0 | 1.2 | 2.2 | 1.17 |
| BaO | 0 | 0 | 0 | 0 | 0 | 0 | 0 | 0 |
| ZnO | 0 | 0 | 0 | 0 | 0 | 0 | 0 | 0 |
| $SnO_2$ | 0.1 | 0.1 | 0.1 | 0.1 | 0.2 | 0.1 | 0.1 | 0.1 |
| $Fe_2O_3$ | 0.01 | 0.01 | 0 | 0 | 0.01 | 0 | 0 | 0 |
| $ZrO_2$ | | | | | | | | |
| Total $R_2O$ | 9.46 | 10 | 10.77 | 10.91 | 12.75 | 10.72 | 10.84 | 10.69 |
| $T_{Brkdwn}$ (calc) | 1255.88 | 1301.54 | 1284.08 | 1283.85 | 1246.91 | 1290.02 | 1240.92 | 1293.86 |
| $T_{Brkwn}-T_{35k}$ | 7.881 | 80.544 | 82.081 | 82.858 | 39.912 | 81.022 | 16.923 | 87.869 |
| Na release, buffered aqueous test | 13 | 13 | | | 35 | | | |
| K release, buffered aqueous test | 5.05 | 15 | | | 2 | | | |
| (Na + K), buffered aqueous test | 18.05 | 28 | | | 37 | | | |
| Na release model | 10.4795 | 11.5703 | 18.9718 | 19.0133 | 41.4406 | 19.6821 | 16.478 | 18.4754 |
| Strain Pt. [° C.] | 618 | 594.5 | 594 | 584 | 601 | 592 | 600 | 589 |
| CTE [×10$^{-7}$] | 70.2 | 72.4 | 71.1 | 72.4 | 76.7 | 70.5 | 71.9 | 70.3 |
| Density [g/cc] | 2.493 | 2.446 | 2.439 | 2.441 | 2.44 | 2.441 | 2.466 | 2.437 |
| $T_{400}$ [° C.] | 1667 | 1631 | 1622 | 1620 | 1584 | 1627 | 1637 | 1627 |
| $T_{35000}$ [° C.] | 1256 | 1229 | 1202 | 1201 | 1207 | 1209 | 1224 | 1206 |
| $T_{liq}$ [° C.] | 1085 | 1115 | 1120 | 1120 | 1120 | 1080 | 1110 | |
| Liquidus Viscosity [kP] | 777 | 248 | 134 | 131 | | 150 | 451 | 168 |

| | 113 | 114 | 115 | 116 | 117 | 118 | 119 | 120 |
|---|---|---|---|---|---|---|---|---|
| $SiO_2$ | 73.16 | 70.64 | 70.64 | 72.17 | 70.64 | 70.64 | 71.59 | 70.48 |
| $Al_2O_3$ | 7.57 | 9.42 | 9.42 | 8.69 | 9.42 | 9.42 | 8.66 | 9.46 |
| $B_2O_3$ | 0.5 | 1 | 1 | 0.54 | 1 | 1 | 0.53 | 1.04 |
| $Na_2O$ | 5.96 | 8.36 | 7.36 | 5.05 | 6.36 | 6.36 | 5.07 | 10.37 |
| $K_2O$ | 4.65 | 2.48 | 3.48 | 4.5 | 4.48 | 4.48 | 4.73 | 1.46 |
| MgO | 3.85 | 4.72 | 4.72 | 3.22 | 4.72 | 3.72 | 4.18 | 4.76 |
| CaO | 2.55 | 1.08 | 1.08 | 2.22 | 2.08 | 2.58 | 3.65 | 1.11 |
| SrO | 1.66 | 2.2 | 2.2 | 3.49 | 1.2 | 1.7 | 1.46 | 1.21 |
| BaO | 0 | 0 | 0 | 0.01 | 0 | 0 | 0.02 | 0.02 |
| ZnO | 0 | 0 | 0 | 0 | 0 | 0 | 0 | 0 |
| $SnO_2$ | 0.1 | 0.1 | 0.1 | 0.1 | 0.1 | 0.1 | 0.09 | 0.07 |
| $Fe_2O_3$ | 0 | 0 | 0 | 0.01 | 0 | 0 | 0.01 | 0.01 |
| $ZrO_2$ | | | | | | | | |
| Total $R_2O$ | 10.61 | 10.84 | 10.84 | 9.55 | 10.84 | 10.84 | 9.8 | 11.83 |
| $T_{Brkdwn}$ (calc) | 1295.13 | 1272.94 | 1263.07 | 1275.75 | 1253.20 | 1240.92 | 1268.23 | 1271.12 |
| $T_{Brkwn}-T_{35k}$ | 84.138 | 52.943 | 35.076 | 47.751 | 17.208 | 16.923 | 43.235 | 65.128 |
| Na release, buffered aqueous test | | | | 14.5 | | | 15.5 | 38.5 |
| K release, buffered aqueous test | | | | 6 | | | 6.1 | 1.5 |
| (Na + K), buffered aqueous test | | | | 20.5 | | | 21.6 | 40 |

TABLE 1-continued

| | Glass Number | | | | | | | |
|---|---|---|---|---|---|---|---|---|
| Na release model | 19.4761 | 22.1590 | 18.8417 | 12.3922 | 15.5359 | 16.3931 | 12.5975 | 32.1115 |
| Strain Pt. [° C.] | 592 | 600 | 603 | 604.6 | 608 | 602 | | |
| CTE [×10⁻⁷] | 70 | 69.9 | 70.4 | 71.6 | 70.4 | 71.3 | | |
| Density [g/cc] | 2.445 | 2.463 | 2.46 | 2.491 | 2.443 | 2.458 | | |
| $T_{400}$ [° C.] | 1632 | 1624 | 1636 | 1647 | 1646 | 1636 | 1631 | 1609 |
| $T_{35000}$ [° C.] | 1211 | 1220 | 1228 | 1242 | 1236 | 1224 | 1225 | 1197 |
| $T_{liq}$ [° C.] | 1095 | 1090 | 1090 | 1070 | 1110 | 1105 | 1150 | 1040 |
| Liquidus Viscosity [kP] | 248 | 351 | 407 | 785 | 313 | 272 | 122 | 579 |

| | 121 | 122 | 123 | 124 | 125 | 126 | 127 |
|---|---|---|---|---|---|---|---|
| $SiO_2$ | 68.85 | 73.75 | 71.17 | 72.92 | 70.64 | 72.66 | 75.1 |
| $Al_2O_3$ | 10.04 | 6.98 | 10.01 | 8.03 | 9.42 | 8.24 | 4.76 |
| $B_2O_3$ | 4.52 | 0 | 0.27 | 0.56 | 1 | 0.84 | 0.28 |
| $Na_2O$ | 7.95 | 6.42 | 11.19 | 6.4 | 6.36 | 6.41 | 1.77 |
| $K_2O$ | 0.21 | 5.29 | 0.95 | 4.02 | 4.48 | 3.8 | 8.78 |
| MgO | 4.89 | 3.73 | 3.65 | 3.75 | 4.72 | 3.81 | 4.36 |
| CaO | 1.66 | 3.2 | 1.46 | 3.05 | 1.08 | 2.94 | 3.75 |
| SrO | 1.76 | 0.52 | 1.19 | 1.16 | 2.2 | 1.19 | 1.06 |
| BaO | 0.03 | 0 | 0 | 0.01 | 0 | 0.02 | 0.02 |
| ZnO | 0 | 0 | 0 | 0 | 0 | 0 | 0 |
| $SnO_2$ | 0.08 | 0.1 | 0.1 | 0.09 | 0.1 | 0.09 | 0.098 |
| $Fe_2O_3$ | 0.01 | 0.01 | 0.01 | 0.01 | 0 | 0.01 | 0.01 |
| $ZrO_2$ | | | | | | | |
| Total $R_2O$ | 8.16 | 11.71 | 12.14 | 10.42 | 10.84 | 10.21 | 11.2 |
| $T_{Brkdwn}$ (calc) | 1356.00 | 1280.78 | 1260.25 | 1297.60 | 1253.20 | 1302.18 | 1312 |
| $T_{Brkwn}-T_{35k}$ | 159.00 | 87.789 | 35.251 | 79.606 | 17.208 | 82.184 | 94 |
| Na release, buffered aqueous test | 14.5 | 22 | 37 | 17 | | 15.5 | 12 |
| K release, buffered aqueous test | 0 | 10.5 | 0.685 | 4.7 | | 3.7 | 55.1 |
| (Na + K), buffered aqueous test | 14.5 | 32.5 | 37.685 | 21.7 | | 19.2 | 67.1 |
| Na release model | 14.7321 | 22.6641 | 35.6135 | 19.1598 | 15.7056 | 17.6711 | 11.9992 |
| Strain Pt. [° C.] | | 568.7 | 599.4 | | 605 | | 587 |
| CTE [×10⁻⁷] | | 78.1 | 72.4 | | 71 | | 75.4 |
| Density [g/cc] | | 2.435 | 2.448 | | 2.459 | | 2.435 |
| $T_{400}$ [° C.] | 1575 | 1612 | 1636 | 1640 | 1648 | 1640 | 1617 |
| $T_{35000}$ [° C.] | 1183 | 1193 | 1225 | 1218 | 1236 | 1222 | 1218 |
| $T_{liq}$ [° C.] | 1110 | 1040 | 1050 | 1105 | 1090 | 1120 | 1000 |
| Liquidus Viscosity [kP] | 123 | 526 | 879 | 229 | 474 | 189 | 2163 |

In order to evaluate the propensity for a glass to release alkali ions from the surface, a test method (referred to as "buffered aqueous release") has been developed wherein the release of these ions into a buffered aqueous solution from a crushed glass powder is measured. Bulk glass is crushed in a ball mill and sieved to −230/+325 mesh (particle size 45-63 μm). The crushed powder is then ultrasonically cleaned in acetone several times to remove fine particles and dried overnight at 50° C. This results in a BET specific surface area of approximately 0.1 m²/g±20%. 5 grams of the cleaned powder are placed into a pre-cleaned 250 mL fluorinated ethylene propylene (FEP) bottle and filled with 75 mL of 0.05 M TRIS buffer (pH 7.5) pre-heated to 95° C. This particular buffer solution has been selected due to its extremely low concentrations of sodium and potassium, as well as its neutral pH. The bottles are capped and then placed into a drying oven at 95° C. and held for 48 hours, unagitated. At the end of this exposure, 20 mL aliquots of solution are extracted away from the glass powder bed and analyzed for metal ion concentration by ICP-MS (inductively coupled plasma mass spectrometry). A "blank" solution without any glass powder is included as a baseline control in each test. The absolute concentrations of sodium and potassium are subtracted from any solution contamination detected in the blank solution and are directly compared between glass compositions. Generally, each glass composition is tested in duplicate and the average concentration values are reported.

The sodium release test shows a correlation between the performance of glasses in CIGS processes and has found that glasses that release less than 10 ppm of sodium into the aqueous solution tend to deliver insufficient sodium to the CIGS film during processing, causing the subsequent CIGS film to have lower than optimal efficiency. Further, previous work has focused on pushing the limits of sodium release as it is thought that maximizing sodium release is beneficial to the CIGS process. A surprising result is that glasses releasing more than 40 ppm of sodium in the aqueous test are the same glasses that have problems, such as film delamination, during the CIGS process.

In addition to the specific example embodiments shown in Table 1, there are compositional ranges may also provide the attributes, properties or desired traits disclosed herein. Example compositional ranges embodied herein are shown in Table 2 (all values listed in mol %).

TABLE 2

|  | 1 | 2 | 3 | 4 | 5 | 6 | 7 | 8 |
|---|---|---|---|---|---|---|---|---|
| $SiO_2$ | 65-80 | 65-80 | 65-80 | 65-80 | 65-80 | 65-80 | 65-80 | 65-80 |
| $Al_2O_3$ | 3-13 | 3-13 | 3-13 | 3-13 | 3-13 | 3-13 | 3-13 | 3-13 |
| $B_2O_3$ | 0-5.5 | 0-5.5 | 0-5.5 | 0-5.5 | 0-5.5 | 0-5.5 | 0-5.5 | 0-5.5 |
| $Na_2O$ | 1-12 | 1-12 | 1-12 | 1-12 | 1-12 | 1-12 | 1-12 | 1-12 |
| MgO | >0-10 | >0-10 | >0-10 | >0-10 | >0-10 | >0-10 | >0-10 | >0-10 |
| CaO | >0-10 | >0-10 | >0-10 | >0-10 | >0-10 | >0-10 | >0-10 | >0-10 |
| SrO | 0-10 | 0-10 | 0-10 | 0-10 | 0-10 | 0-10 | 0-10 | 0-10 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total $R_2O$ | 7-15 | 7-15 | 7-15 | 7-15 | 7-15 | 7-13 | 7-15 | 7-15 |
| Total RO | 1-15 | 5-15 | 1-11 | 5-11 | 1-15 | 1-15 | 5-15 | 1-11 |
| $R_2O$-RO | −4-8 | −4-8 | −4-8 | −4-8 | −2-8 | −4-8 | −2-8 | −2-8 |

|  | 9 | 10 | 11 | 12 | 13 | 14 | 15 | 16 |
|---|---|---|---|---|---|---|---|---|
| $SiO_2$ | 65-80 | 65-80 | 65-80 | 65-80 | 65-80 | 65-80 | 65-80 | 65-80 |
| $Al_2O_3$ | 3-13 | 3-13 | 3-13 | 3-13 | 3-13 | 3-13 | 3-13 | 3-13 |
| $B_2O_3$ | 0-5.5 | 0-5.5 | 0-5.5 | 0-5.5 | 0-5.5 | 0-5.5 | 0-5.5 | 0-5.5 |
| $Na_2O$ | 1-12 | 1-12 | 1-12 | 1-12 | 1-12 | 1-12 | 1-12 | 1-12 |
| MgO | >0-10 | >0-10 | >0-10 | >0-10 | >0-10 | >0-10 | >0-10 | >0-10 |
| CaO | >0-10 | >0-10 | >0-10 | >0-10 | >0-10 | >0-10 | >0-10 | >0-10 |
| SrO | 0-10 | 0-10 | 0-10 | 0-10 | 0-10 | 0-10 | 0-10 | 0-10 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total $R_2O$ | 7-15 | 7-13 | 7-13 | 7-13 | 7-13 | 7-13 | 7-13 | 7-13 |
| Total RO | 5-11 | 1-15 | 5-15 | 1-11 | 5-11 | 5-15 | 1-11 | 5-11 |
| $R_2O$-RO | −2-8 | −2-8 | −4-8 | −4-8 | −4-8 | −2-8 | −2-8 | −2-8 |

|  | 17 | 18 | 19 | 20 | 21 | 22 | 23 | 24 |
|---|---|---|---|---|---|---|---|---|
| $SiO_2$ | 65-80 | 65-80 | 65-80 | 65-80 | 65-80 | 65-80 | 65-80 | 65-80 |
| $Al_2O_3$ | 3-13 | 3-13 | 3-13 | 3-13 | 3-13 | 3-13 | 3-13 | 3-13 |
| $B_2O_3$ | 0-5.5 | 0-5.5 | 0-5.5 | 0-5.5 | 0-5.5 | 0-5.5 | 0-5.5 | 0-5.5 |
| $Na_2O$ | 1-12 | 1-12 | 1-12 | 1-12 | 1-12 | 1-12 | 1-12 | 1-12 |
| MgO | >0-10 | >0-10 | >0-10 | >0-10 | >0-10 | >0-10 | >0-10 | >0-10 |
| CaO | >0-10 | >0-10 | >0-10 | >0-10 | >0-10 | >0-10 | >0-10 | >0-10 |
| SrO | 0-10 | 0-10 | 0-10 | 0-10 | 0-10 | 0-10 | 0-10 | 0-10 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total $R_2O$ | 9-15 | 7-12 | 9-12 | 7-15 | 7-15 | 7-15 | 7-15 | 7-15 |
| Total RO | 1-15 | 1-15 | 1-15 | 6-15 | 1-9 | 6-9 | 1-15 | 1-15 |
| $R_2O$-RO | −4-8 | −4-8 | −4-8 | −4-8 | −4-8 | −4-8 | 0-8 | −4-6 |

|  | 25 | 26 | 27 | 28 | 29 | 30 | 31 | 32 |
|---|---|---|---|---|---|---|---|---|
| $SiO_2$ | 65-80 | 65-80 | 65-80 | 65-80 | 65-80 | 65-80 | 65-80 | 65-80 |
| $Al_2O_3$ | 3-13 | 3-13 | 3-13 | 3-13 | 3-13 | 3-13 | 3-13 | 3-13 |
| $B_2O_3$ | 0-5.5 | 0-5.5 | 0-5.5 | 0-5.5 | 0-5.5 | 0-5.5 | 0-5.5 | 0-5.5 |
| $Na_2O$ | 1-12 | 1-12 | 1-12 | 1-12 | 1-12 | 1-12 | 1-12 | 1-12 |
| MgO | >0-10 | >0-10 | >0-10 | >0-10 | >0-10 | >0-10 | >0-10 | >0-10 |
| CaO | >0-10 | >0-10 | >0-10 | >0-10 | >0-10 | >0-10 | >0-10 | >0-10 |
| SrO | 0-10 | 0-10 | 0-10 | 0-10 | 0-10 | 0-10 | 0-10 | 0-10 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total $R_2O$ | 7-15 | 9-15 | 9-15 | 9-15 | 9-15 | 9-15 | 9-15 | 7-12 |
| Total RO | 1-15 | 6-15 | 1-9 | 6-9 | 1-15 | 1-15 | 1-15 | 6-15 |
| $R_2O$-RO | 0-6 | −4-8 | −4-8 | −4-8 | 0-8 | −4-6 | 0-6 | −4-8 |

TABLE 2-continued

| | 33 | 34 | 35 | 36 | 37 | 38 | 39 | 40 |
|---|---|---|---|---|---|---|---|---|
| SiO$_2$ | 65-80 | 65-80 | 65-80 | 65-80 | 65-80 | 66-80 | 67-80 | 68-80 |
| Al$_2$O$_3$ | 3-13 | 3-13 | 3-13 | 3-13 | 3-13 | 4-13 | 5-13 | 6-13 |
| B$_2$O$_3$ | 0-5.5 | 0-5.5 | 0-5.5 | 0-5.5 | 0-5.5 | 1-5.5 | 2-5.5 | 3-5.5 |
| Na$_2$O | 1-12 | 1-12 | 1-12 | 1-12 | 1-12 | 2-12 | 3-12 | 4-12 |
| MgO | >0-10 | >0-10 | >0-10 | >0-10 | >0-10 | >0-10 | >0-10 | >0-10 |
| CaO | >0-10 | >0-10 | >0-10 | >0-10 | >0-10 | >0-10 | >0-10 | >0-10 |
| SrO | 0-10 | 0-10 | 0-10 | 0-10 | 0-10 | 1-10 | 2-10 | 3-10 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total R$_2$O | 7-12 | 7-12 | 7-12 | 7-12 | 7-12 | 9-12 | 9-12 | 9-12 |
| Total RO | 1-9 | 6-9 | 1-15 | 1-15 | 1-15 | 6-15 | 1-9 | 6-9 |
| R$_2$O-RO | −4-8 | −4-8 | 0-8 | −4-6 | 0-6 | −4-8 | −4-8 | −4-8 |

| | 41 | 42 | 43 | 44 | 45 | 46 | 47 | 48 |
|---|---|---|---|---|---|---|---|---|
| SiO$_2$ | 69-80 | 70-80 | 71-80 | 65-80 | 65-80 | 65-80 | 65-80 | 65-80 |
| Al$_2$O$_3$ | 7-13 | 8-13 | 9-13 | 3-13 | 3-13 | 3-13 | 3-13 | 3-13 |
| B$_2$O$_3$ | 4-5.5 | 5-5.5 | 6-5.5 | 0-5.5 | 0-5.5 | 0-5.5 | 0-5.5 | 0-5.5 |
| Na$_2$O | 5-12 | 6-12 | 7-12 | 1-12 | 1-12 | 1-12 | 1-12 | 1-12 |
| MgO | >0-10 | >0-10 | >0-10 | >0-10 | >0-10 | >0-10 | >0-10 | >0-10 |
| CaO | >0-10 | >0-10 | >0-10 | >0-10 | >0-10 | >0-10 | >0-10 | >0-10 |
| SrO | 4-10 | 5-10 | 6-10 | 0-10 | 0-10 | 0-10 | 0-10 | 0-10 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total R$_2$O | 9-12 | 9-12 | 9-12 | 9-15 | 7-12 | 9-12 | 7-15 | 7-15 |
| Total RO | 1-15 | 1-15 | 1-15 | 6-15 | 6-15 | 6-15 | 6-15 | 6-15 |
| R$_2$O-RO | 0-8 | −4-6 | 0-6 | −4-8 | −4-8 | −4-8 | 0-8 | −4-6 |

| | 49 | 50 | 51 | 52 | 53 | 54 | 55 | 56 |
|---|---|---|---|---|---|---|---|---|
| SiO$_2$ | 65-80 | 65-80 | 65-80 | 65-80 | 65-80 | 65-80 | 65-80 | 65-80 |
| Al$_2$O$_3$ | 3-13 | 3-13 | 3-13 | 3-13 | 3-13 | 3-13 | 3-13 | 3-13 |
| B$_2$O$_3$ | 0-5.5 | 0-5.5 | 0-5.5 | 0-5.5 | 0-5.5 | 0-5.5 | 0-5.5 | 0-5.5 |
| Na$_2$O | 1-12 | 1-12 | 1-12 | 1-12 | 1-12 | 1-12 | 1-12 | 1-12 |
| MgO | >0-10 | >0-10 | >0-10 | >0-10 | >0-10 | >0-10 | >0-10 | >0-10 |
| CaO | >0-10 | >0-10 | >0-10 | >0-10 | >0-10 | >0-10 | >0-10 | >0-10 |
| SrO | 0-10 | 0-10 | 0-10 | 0-10 | 0-10 | 0-10 | 0-10 | 0-10 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total R$_2$O | 7-15 | 9-15 | 7-12 | 9-12 | 7-15 | 7-15 | 7-15 | 9-15 |
| Total RO | 6-15 | 1-9 | 1-9 | 1-9 | 1-9 | 1-9 | 1-9 | 6-9 |
| R$_2$O-RO | 0-6 | −4-8 | −4-8 | −4-8 | 0-8 | −4-6 | 0-6 | −4-8 |

| | 57 | 58 | 59 | 60 | 61 | 62 | 63 | 64 |
|---|---|---|---|---|---|---|---|---|
| SiO$_2$ | 65-80 | 65-80 | 65-80 | 65-80 | 65-80 | 65-80 | 65-80 | 65-80 |
| Al$_2$O$_3$ | 3-13 | 3-13 | 3-13 | 3-13 | 3-13 | 3-13 | 3-13 | 3-13 |
| B$_2$O$_3$ | 0-5.5 | 0-5.5 | 0-5.5 | 0-5.5 | 0-5.5 | 0-5.5 | 0-5.5 | 0-5.5 |
| Na$_2$O | 1-12 | 1-12 | 1-12 | 1-12 | 1-12 | 1-12 | 1-12 | 1-12 |
| MgO | >0-10 | >0-10 | >0-10 | >0-10 | >0-10 | >0-10 | >0-10 | >0-10 |
| CaO | >0-10 | >0-10 | >0-10 | >0-10 | >0-10 | >0-10 | >0-10 | >0-10 |
| SrO | 0-10 | 0-10 | 0-10 | 0-10 | 0-10 | 0-10 | 0-10 | 0-10 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total R$_2$O | 7-12 | 9-12 | 7-15 | 7-15 | 7-15 | 9-15 | 7-12 | 9-12 |
| Total RO | 6-9 | 6-9 | 6-9 | 6-9 | 6-9 | 1-15 | 1-15 | 1-15 |
| R$_2$O-RO | −4-8 | −4-8 | 0-8 | −4-6 | 0-6 | 0-8 | 0-8 | 0-8 |

| | 65 | 66 | 67 | 68 | 69 | 70 | 71 | 72 |
|---|---|---|---|---|---|---|---|---|
| SiO$_2$ | 66-80 | 67-80 | 68-80 | 69-80 | 70-80 | 71-80 | 72-80 | 73-80 |
| Al$_2$O$_3$ | 4-13 | 5-13 | 6-13 | 7-13 | 8-13 | 9-13 | 10-13 | 11-13 |
| B$_2$O$_3$ | 1-5.5 | 2-5.5 | 3-5.5 | 4-5.5 | 5-5.5 | 6-5.5 | 7-5.5 | 8-5.5 |
| Na$_2$O | 2-12 | 3-12 | 4-12 | 5-12 | 6-12 | 7-12 | 8-12 | 9-12 |
| MgO | >0-10 | >0-10 | >0-10 | >0-10 | >0-10 | >0-10 | >0-10 | >0-10 |
| CaO | >0-10 | >0-10 | >0-10 | >0-10 | >0-10 | >0-10 | >0-10 | >0-10 |
| SrO | 1-10 | 2-10 | 3-10 | 4-10 | 5-10 | 6-10 | 7-10 | 8-10 |

TABLE 2-continued

|  | | | | | | | | |
|---|---|---|---|---|---|---|---|---|
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total $R_2O$ | 7-15 | 7-15 | 7-15 | 9-15 | 7-12 | 9-12 | 7-15 | 7-15 |
| Total RO | 6-15 | 1-9 | 6-9 | 1-15 | 1-15 | 1-15 | 6-15 | 1-9 |
| $R_2O$-RO | 0-8 | 0-8 | 0-8 | −4-6 | −4-6 | −4-6 | −4-6 | −4-6 |

|  | 73 | 74 | 75 | 76 | 77 | 78 | 79 | 80 |
|---|---|---|---|---|---|---|---|---|
| $SiO_2$ | 74-80 | 75-80 | 76-80 | 77-80 | 78-80 | 79-80 | 80-80 | 65-80 |
| $Al_2O_3$ | 12-13 | 13-13 | 14-13 | 15-13 | 16-13 | 17-13 | 18-13 | 3-13 |
| $B_2O_3$ | 9-5.5 | 10-5.5 | 11-5.5 | 12-5.5 | 13-5.5 | 14-5.5 | 15-5.5 | 0-5.5 |
| $Na_2O$ | 10-12 | 11-12 | 12-12 | 13-12 | 14-12 | 15-12 | 16-12 | 1-12 |
| MgO | >0-10 | >0-10 | >0-10 | >0-10 | >0-10 | >0-10 | >0-10 | >0-10 |
| CaO | >0-10 | >0-10 | >0-10 | >0-10 | >0-10 | >0-10 | >0-10 | >0-10 |
| SrO | 9-10 | 10-10 | 11-10 | 12-10 | 13-10 | 14-10 | 15-10 | 0-10 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total $R_2O$ | 7-15 | 9-15 | 7-12 | 9-12 | 7-15 | 7-15 | 7-15 | 9-15 |
| Total RO | 6-9 | 1-15 | 1-15 | 1-15 | 6-15 | 1-9 | 6-9 | 6-15 |
| $R_2O$-RO | −4-6 | 0-6 | 0-6 | 0-6 | 0-6 | 0-6 | 0-6 | 0-8 |

|  | 81 | 82 | 83 | 84 | 85 | 86 | 87 | 88 |
|---|---|---|---|---|---|---|---|---|
| $SiO_2$ | 65-80 | 65-80 | 65-80 | 65-80 | 65-80 | 65-80 | 65-80 | 65-80 |
| $Al_2O_3$ | 3-13 | 3-13 | 3-13 | 3-13 | 3-13 | 3-13 | 3-13 | 3-13 |
| $B_2O_3$ | 0-5.5 | 0-5.5 | 0-5.5 | 0-5.5 | 0-5.5 | 0-5.5 | 0-5.5 | 0-5.5 |
| $Na_2O$ | 1-12 | 1-12 | 1-12 | 1-12 | 1-12 | 1-12 | 1-12 | 1-12 |
| MgO | >0-10 | >0-10 | >0-10 | >0-10 | >0-10 | >0-10 | >0-10 | >0-10 |
| CaO | >0-10 | >0-10 | >0-10 | >0-10 | >0-10 | >0-10 | >0-10 | >0-10 |
| SrO | 0-10 | 0-10 | 0-10 | 0-10 | 0-10 | 0-10 | 0-10 | 0-10 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total $R_2O$ | 9-15 | 9-15 | 9-15 | 9-15 | 9-15 | 9-15 | 9-15 | 9-15 |
| Total RO | 6-15 | 6-15 | 1-9 | 1-9 | 1-9 | 6-9 | 6-9 | 6-9 |
| $R_2O$-RO | −4-6 | 0-6 | 0-8 | −4-6 | 0-6 | 0-8 | −4-6 | 0-6 |

|  | 89 | 90 | 91 | 92 | 93 | 94 | 95 | 96 |
|---|---|---|---|---|---|---|---|---|
| $SiO_2$ | 65-80 | 65-80 | 65-80 | 65-80 | 65-80 | 65-80 | 65-80 | 65-80 |
| $Al_2O_3$ | 3-13 | 3-13 | 3-13 | 3-13 | 3-13 | 3-13 | 3-13 | 3-13 |
| $B_2O_3$ | 0-5.5 | 0-5.5 | 0-5.5 | 0-5.5 | 0-5.5 | 0-5.5 | 0-5.5 | 0-5.5 |
| $Na_2O$ | 1-12 | 1-12 | 1-12 | 1-12 | 1-12 | 1-12 | 1-12 | 1-12 |
| MgO | >0-10 | >0-10 | >0-10 | >0-10 | >0-10 | >0-10 | >0-10 | >0-10 |
| CaO | >0-10 | >0-10 | >0-10 | >0-10 | >0-10 | >0-10 | >0-10 | >0-10 |
| SrO | 0-10 | 0-10 | 0-10 | 0-10 | 0-10 | 0-10 | 0-10 | 0-10 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total $R_2O$ | 7-12 | 7-12 | 7-12 | 7-12 | 7-12 | 7-12 | 7-12 | 7-12 |
| Total RO | 6-15 | 6-15 | 6-15 | 1-9 | 1-9 | 1-9 | 6-9 | 6-9 |
| $R_2O$-RO | 0-8 | −4-6 | 0-6 | 0-8 | −4-6 | 0-6 | 0-8 | −4-6 |

|  | 97 | 98 | 99 | 100 | 101 | 102 | 103 | 104 |
|---|---|---|---|---|---|---|---|---|
| $SiO_2$ | 65-80 | 65-80 | 65-80 | 65-80 | 66-80 | 67-80 | 68-80 | 69-80 |
| $Al_2O_3$ | 3-13 | 3-13 | 3-13 | 3-13 | 4-13 | 5-13 | 6-13 | 7-13 |
| $B_2O_3$ | 0-5.5 | 0-5.5 | 0-5.5 | 0-5.5 | 1-5.5 | 2-5.5 | 3-5.5 | 4-5.5 |
| $Na_2O$ | 1-12 | 1-12 | 1-12 | 1-12 | 2-12 | 3-12 | 4-12 | 5-12 |
| MgO | >0-10 | >0-10 | >0-10 | >0-10 | >0-10 | >0-10 | >0-10 | >0-10 |
| CaO | >0-10 | >0-10 | >0-10 | >0-10 | >0-10 | >0-10 | >0-10 | >0-10 |
| SrO | 0-10 | 0-10 | 0-10 | 0-10 | 1-10 | 2-10 | 3-10 | 4-10 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total $R_2O$ | 7-12 | 9-12 | 9-12 | 9-12 | 9-12 | 9-12 | 9-12 | 9-12 |
| Total RO | 6-9 | 6-15 | 6-15 | 6-15 | 1-9 | 1-9 | 1-9 | 6-9 |
| $R_2O$-RO | 0-6 | 0-8 | −4-6 | 0-6 | 0-8 | −4-6 | 0-6 | 0-8 |

|  | 105 | 106 | 107 | 108 | 109 | 110 | 111 | 112 |
|---|---|---|---|---|---|---|---|---|
| $SiO_2$ | 70-80 | 71-80 | 70-75 | 70-75 | 70-75 | 70-75 | 70-75 | 70-75 |
| $Al_2O_3$ | 8-13 | 9-13 | 8-11 | 8-11 | 8-11 | 8-11 | 8-11 | 8-11 |

TABLE 2-continued

|   | | | | | | | | |
|---|---|---|---|---|---|---|---|---|
| $B_2O_3$ | 5-5.5 | 6-5.5 | 0.5-1 | 0.5-1 | 0.5-1 | 0.5-1 | 0.5-1 | 0.5-1 |
| $Na_2O$ | 6-12 | 7-12 | 5-11.5 | 5-11.5 | 5-11.5 | 5-11.5 | 5-11.5 | 5-11.5 |
| MgO | >0-10 | >0-10 | 0.5-5 | 0.5-5 | 0.5-5 | 0.5-5 | 0.5-5 | 0.5-5 |
| CaO | >0-10 | >0-10 | 3-5 | 3-5 | 3-5 | 3-5 | 3-5 | 3-5 |
| SrO | 5-10 | 6-10 | 0.5-3 | 0.5-3 | 0.5-3 | 0.5-3 | 0.5-3 | 0.5-3 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total $R_2O$ | 9-12 | 9-12 | 7-15 | 7-15 | 7-15 | 7-15 | 7-15 | 7-13 |
| Total RO | 6-9 | 6-9 | 1-15 | 5-15 | 1-11 | 5-11 | 1-15 | 1-15 |
| $R_2O$-RO | -4-6 | 0-6 | -4-8 | -4-8 | -4-8 | -4-8 | -2-8 | -4-8 |

|   | 113 | 114 | 115 | 116 | 117 | 118 | 119 | 120 |
|---|---|---|---|---|---|---|---|---|
| $SiO_2$ | 70-75 | 70-75 | 70-75 | 70-75 | 70-75 | 70-75 | 70-75 | 70-75 |
| $Al_2O_3$ | 8-11 | 8-11 | 8-11 | 8-11 | 8-11 | 8-11 | 8-11 | 8-11 |
| $B_2O_3$ | 0.5-1 | 0.5-1 | 0.5-1 | 0.5-1 | 0.5-1 | 0.5-1 | 0.5-1 | 0.5-1 |
| $Na_2O$ | 5-11.5 | 5-11.5 | 5-11.5 | 5-11.5 | 5-11.5 | 5-11.5 | 5-11.5 | 5-11.5 |
| MgO | 0.5-5 | 0.5-5 | 0.5-5 | 0.5-5 | 0.5-5 | 0.5-5 | 0.5-5 | 0.5-5 |
| CaO | 3-5 | 3-5 | 3-5 | 3-5 | 3-5 | 3-5 | 3-5 | 3-5 |
| SrO | 0.5-3 | 0.5-3 | 0.5-3 | 0.5-3 | 0.5-3 | 0.5-3 | 0.5-3 | 0.5-3 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total $R_2O$ | 7-15 | 7-15 | 7-15 | 7-13 | 7-13 | 7-13 | 7-13 | 7-13 |
| Total RO | 5-15 | 1-11 | 5-11 | 1-15 | 5-15 | 1-11 | 5-11 | 5-15 |
| $R_2O$-RO | -2-8 | -2-8 | -2-8 | -2-8 | -4-8 | -4-8 | -4-8 | -2-8 |

|   | 121 | 122 | 123 | 124 | 125 | 126 | 127 | 128 |
|---|---|---|---|---|---|---|---|---|
| $SiO_2$ | 70-75 | 70-75 | 70-75 | 70-75 | 70-75 | 70-75 | 70-75 | 70-75 |
| $Al_2O_3$ | 8-11 | 8-11 | 8-11 | 8-11 | 8-11 | 8-11 | 8-11 | 8-11 |
| $B_2O_3$ | 0.5-1 | 0.5-1 | 0.5-1 | 0.5-1 | 0.5-1 | 0.5-1 | 0.5-1 | 0.5-1 |
| $Na_2O$ | 5-11.5 | 5-11.5 | 5-11.5 | 5-11.5 | 5-11.5 | 5-11.5 | 5-11.5 | 5-11.5 |
| MgO | 0.5-5 | 0.5-5 | 0.5-5 | 0.5-5 | 0.5-5 | 0.5-5 | 0.5-5 | 0.5-5 |
| CaO | 3-5 | 3-5 | 3-5 | 3-5 | 3-5 | 3-5 | 3-5 | 3-5 |
| SrO | 0.5-3 | 0.5-3 | 0.5-3 | 0.5-3 | 0.5-3 | 0.5-3 | 0.5-3 | 0.5-3 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total $R_2O$ | 7-13 | 7-13 | 9-15 | 7-12 | 9-12 | 7-15 | 7-15 | 7-15 |
| Total RO | 1-11 | 5-11 | 1-15 | 1-15 | 1-15 | 6-15 | 1-9 | 6-9 |
| $R_2O$-RO | -2-8 | -2-8 | -4-8 | -4-8 | -4-8 | -4-8 | -4-8 | -4-8 |

|   | 129 | 130 | 131 | 132 | 133 | 134 | 135 | 136 |
|---|---|---|---|---|---|---|---|---|
| $SiO_2$ | 70-75 | 70-75 | 70-75 | 70-75 | 70-75 | 70-75 | 70-75 | 70-75 |
| $Al_2O_3$ | 8-11 | 8-11 | 8-11 | 8-11 | 8-11 | 8-11 | 8-11 | 8-11 |
| $B_2O_3$ | 0.5-1 | 0.5-1 | 0.5-1 | 0.5-1 | 0.5-1 | 0.5-1 | 0.5-1 | 0.5-1 |
| $Na_2O$ | 5-11.5 | 5-11.5 | 5-11.5 | 5-11.5 | 5-11.5 | 5-11.5 | 5-11.5 | 5-11.5 |
| MgO | 0.5-5 | 0.5-5 | 0.5-5 | 0.5-5 | 0.5-5 | 0.5-5 | 0.5-5 | 0.5-5 |
| CaO | 3-5 | 3-5 | 3-5 | 3-5 | 3-5 | 3-5 | 3-5 | 3-5 |
| SrO | 0.5-3 | 0.5-3 | 0.5-3 | 0.5-3 | 0.5-3 | 0.5-3 | 0.5-3 | 0.5-3 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total $R_2O$ | 7-15 | 7-15 | 7-15 | 9-15 | 9-15 | 9-15 | 9-15 | 9-15 |
| Total RO | 1-15 | 1-15 | 1-15 | 6-15 | 1-9 | 6-9 | 1-15 | 1-15 |
| $R_2O$-RO | 0-8 | -4-6 | 0-6 | -4-8 | -4-8 | -4-8 | 0-8 | -4-6 |

|   | 137 | 138 | 139 | 140 | 141 | 142 | 143 | 144 |
|---|---|---|---|---|---|---|---|---|
| $SiO_2$ | 70-75 | 70-75 | 70-75 | 70-75 | 70-75 | 70-75 | 70-75 | 70-75 |
| $Al_2O_3$ | 8-11 | 8-11 | 8-11 | 8-11 | 8-11 | 8-11 | 8-11 | 8-11 |
| $B_2O_3$ | 0.5-1 | 0.5-1 | 0.5-1 | 0.5-1 | 0.5-1 | 0.5-1 | 0.5-1 | 0.5-1 |
| $Na_2O$ | 5-11.5 | 5-11.5 | 5-11.5 | 5-11.5 | 5-11.5 | 5-11.5 | 5-11.5 | 5-11.5 |
| MgO | 0.5-5 | 0.5-5 | 0.5-5 | 0.5-5 | 0.5-5 | 0.5-5 | 0.5-5 | 0.5-5 |
| CaO | 3-5 | 3-5 | 3-5 | 3-5 | 3-5 | 3-5 | 3-5 | 3-5 |
| SrO | 0.5-3 | 0.5-3 | 0.5-3 | 0.5-3 | 0.5-3 | 0.5-3 | 0.5-3 | 0.5-3 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total $R_2O$ | 9-15 | 7-12 | 7-12 | 7-12 | 7-12 | 7-12 | 7-12 | 9-12 |

TABLE 2-continued

| | | | | | | | | |
|---|---|---|---|---|---|---|---|---|
| Total RO | 1-15 | 6-15 | 1-9 | 6-9 | 1-15 | 1-15 | 1-15 | 6-15 |
| R₂O-RO | 0-6 | -4-8 | -4-8 | -4-8 | 0-8 | -4-6 | 0-6 | -4-8 |

| | 145 | 146 | 147 | 148 | 149 | 150 | 151 | 152 |
|---|---|---|---|---|---|---|---|---|
| SiO₂ | 70-75 | 70-75 | 70-75 | 70-75 | 70-75 | 70-75 | 70-75 | 70-75 |
| Al₂O₃ | 8-11 | 8-11 | 8-11 | 8-11 | 8-11 | 8-11 | 8-11 | 8-11 |
| B₂O₃ | 0.5-1 | 0.5-1 | 0.5-1 | 0.5-1 | 0.5-1 | 0.5-1 | 0.5-1 | 0.5-1 |
| Na₂O | 5-11.5 | 5-11.5 | 5-11.5 | 5-11.5 | 5-11.5 | 5-11.5 | 5-11.5 | 5-11.5 |
| MgO | 0.5-5 | 0.5-5 | 0.5-5 | 0.5-5 | 0.5-5 | 0.5-5 | 0.5-5 | 0.5-5 |
| CaO | 3-5 | 3-5 | 3-5 | 3-5 | 3-5 | 3-5 | 3-5 | 3-5 |
| SrO | 0.5-3 | 0.5-3 | 0.5-3 | 0.5-3 | 0.5-3 | 0.5-3 | 0.5-3 | 0.5-3 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total R₂O | 9-12 | 9-12 | 9-12 | 9-12 | 9-12 | 9-15 | 7-12 | 9-12 |
| Total RO | 1-9 | 6-9 | 1-15 | 1-15 | 1-15 | 6-15 | 6-15 | 6-15 |
| R₂O-RO | -4-8 | -4-8 | 0-8 | -4-6 | 0-6 | -4-8 | -4-8 | -4-8 |

| | 153 | 154 | 155 | 156 | 157 | 158 | 159 | 160 |
|---|---|---|---|---|---|---|---|---|
| SiO₂ | 70-75 | 70-75 | 70-75 | 70-75 | 70-75 | 70-75 | 70-75 | 70-75 |
| Al₂O₃ | 8-11 | 8-11 | 8-11 | 8-11 | 8-11 | 8-11 | 8-11 | 8-11 |
| B₂O₃ | 0.5-1 | 0.5-1 | 0.5-1 | 0.5-1 | 0.5-1 | 0.5-1 | 0.5-1 | 0.5-1 |
| Na₂O | 5-11.5 | 5-11.5 | 5-11.5 | 5-11.5 | 5-11.5 | 5-11.5 | 5-11.5 | 5-11.5 |
| MgO | 0.5-5 | 0.5-5 | 0.5-5 | 0.5-5 | 0.5-5 | 0.5-5 | 0.5-5 | 0.5-5 |
| CaO | 3-5 | 3-5 | 3-5 | 3-5 | 3-5 | 3-5 | 3-5 | 3-5 |
| SrO | 0.5-3 | 0.5-3 | 0.5-3 | 0.5-3 | 0.5-3 | 0.5-3 | 0.5-3 | 0.5-3 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total R₂O | 7-15 | 7-15 | 7-15 | 9-15 | 7-12 | 9-12 | 7-15 | 7-15 |
| Total RO | 6-15 | 6-15 | 6-15 | 1-9 | 1-9 | 1-9 | 1-9 | 1-9 |
| R₂O-RO | 0-8 | -4-6 | 0-6 | -4-8 | -4-8 | -4-8 | 0-8 | -4-6 |

| | 161 | 162 | 163 | 164 | 165 | 166 | 167 | 168 |
|---|---|---|---|---|---|---|---|---|
| SiO₂ | 70-75 | 70-75 | 70-75 | 70-75 | 70-75 | 70-75 | 70-75 | 70-75 |
| Al₂O₃ | 8-11 | 8-11 | 8-11 | 8-11 | 8-11 | 8-11 | 8-11 | 8-11 |
| B₂O₃ | 0.5-1 | 0.5-1 | 0.5-1 | 0.5-1 | 0.5-1 | 0.5-1 | 0.5-1 | 0.5-1 |
| Na₂O | 5-11.5 | 5-11.5 | 5-11.5 | 5-11.5 | 5-11.5 | 5-11.5 | 5-11.5 | 5-11.5 |
| MgO | 0.5-5 | 0.5-5 | 0.5-5 | 0.5-5 | 0.5-5 | 0.5-5 | 0.5-5 | 0.5-5 |
| CaO | 3-5 | 3-5 | 3-5 | 3-5 | 3-5 | 3-5 | 3-5 | 3-5 |
| SrO | 0.5-3 | 0.5-3 | 0.5-3 | 0.5-3 | 0.5-3 | 0.5-3 | 0.5-3 | 0.5-3 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total R₂O | 7-15 | 9-15 | 7-12 | 9-12 | 7-15 | 7-15 | 7-15 | 9-15 |
| Total RO | 1-9 | 6-9 | 6-9 | 6-9 | 6-9 | 6-9 | 6-9 | 1-15 |
| R₂O-RO | 0-6 | -4-8 | -4-8 | -4-8 | 0-8 | -4-6 | 0-6 | 0-8 |

| | 169 | 170 | 171 | 172 | 173 | 174 | 175 | 176 |
|---|---|---|---|---|---|---|---|---|
| SiO₂ | 70-75 | 70-75 | 70-75 | 70-75 | 70-75 | 70-75 | 70-75 | 70-75 |
| Al₂O₃ | 8-11 | 8-11 | 8-11 | 8-11 | 8-11 | 8-11 | 8-11 | 8-11 |
| B₂O₃ | 0.5-1 | 0.5-1 | 0.5-1 | 0.5-1 | 0.5-1 | 0.5-1 | 0.5-1 | 0.5-1 |
| Na₂O | 5-11.5 | 5-11.5 | 5-11.5 | 5-11.5 | 5-11.5 | 5-11.5 | 5-11.5 | 5-11.5 |
| MgO | 0.5-5 | 0.5-5 | 0.5-5 | 0.5-5 | 0.5-5 | 0.5-5 | 0.5-5 | 0.5-5 |
| CaO | 3-5 | 3-5 | 3-5 | 3-5 | 3-5 | 3-5 | 3-5 | 3-5 |
| SrO | 0.5-3 | 0.5-3 | 0.5-3 | 0.5-3 | 0.5-3 | 0.5-3 | 0.5-3 | 0.5-3 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total R₂O | 7-12 | 7-12 | 7-15 | 7-15 | 7-15 | 9-15 | 7-12 | 9-12 |
| Total RO | 1-15 | 1-15 | 6-15 | 1-9 | 6-9 | 1-15 | 1-15 | 1-15 |
| R₂O-RO | 0-8 | 0-8 | 0-8 | 0-8 | 0-8 | -4-6 | -4-6 | -4-6 |

| | 177 | 178 | 179 | 180 | 181 | 182 | 183 | 184 |
|---|---|---|---|---|---|---|---|---|
| SiO₂ | 70-75 | 70-75 | 70-75 | 70-75 | 70-75 | 70-75 | 70-75 | 70-75 |
| Al₂O₃ | 8-11 | 8-11 | 8-11 | 8-11 | 8-11 | 8-11 | 8-11 | 8-11 |
| B₂O₃ | 0.5-1 | 0.5-1 | 0.5-1 | 0.5-1 | 0.5-1 | 0.5-1 | 0.5-1 | 0.5-1 |
| Na₂O | 5-11.5 | 5-11.5 | 5-11.5 | 5-11.5 | 5-11.5 | 5-11.5 | 5-11.5 | 5-11.5 |
| MgO | 0.5-5 | 0.5-5 | 0.5-5 | 0.5-5 | 0.5-5 | 0.5-5 | 0.5-5 | 0.5-5 |
| CaO | 3-5 | 3-5 | 3-5 | 3-5 | 3-5 | 3-5 | 3-5 | 3-5 |

TABLE 2-continued

| | | | | | | | | |
|---|---|---|---|---|---|---|---|---|
| SrO | 0.5-3 | 0.5-3 | 0.5-3 | 0.5-3 | 0.5-3 | 0.5-3 | 0.5-3 | 0.5-3 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total $R_2O$ | 7-15 | 7-15 | 7-15 | 9-15 | 7-12 | 9-12 | 7-15 | 7-15 |
| Total RO | 6-15 | 1-9 | 6-9 | 1-15 | 1-15 | 1-15 | 6-15 | 1-9 |
| $R_2O$-RO | −4-6 | −4-6 | −4-6 | 0-6 | 0-6 | 0-6 | 0-6 | 0-6 |

| | 185 | 130 | 131 | 132 | 133 | 134 | 135 | 136 |
|---|---|---|---|---|---|---|---|---|
| $SiO_2$ | 70-75 | 70-75 | 70-75 | 70-75 | 70-75 | 70-75 | 70-75 | 70-75 |
| $Al_2O_3$ | 8-11 | 8-11 | 8-11 | 8-11 | 8-11 | 8-11 | 8-11 | 8-11 |
| $B_2O_3$ | 0.5-1 | 0.5-1 | 0.5-1 | 0.5-1 | 0.5-1 | 0.5-1 | 0.5-1 | 0.5-1 |
| $Na_2O$ | 5-11.5 | 5-11.5 | 5-11.5 | 5-11.5 | 5-11.5 | 5-11.5 | 5-11.5 | 5-11.5 |
| MgO | 0.5-5 | 0.5-5 | 0.5-5 | 0.5-5 | 0.5-5 | 0.5-5 | 0.5-5 | 0.5-5 |
| CaO | 3-5 | 3-5 | 3-5 | 3-5 | 3-5 | 3-5 | 3-5 | 3-5 |
| SrO | 0.5-3 | 0.5-3 | 0.5-3 | 0.5-3 | 0.5-3 | 0.5-3 | 0.5-3 | 0.5-3 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total $R_2O$ | 7-15 | 7-15 | 7-15 | 9-15 | 9-15 | 9-15 | 9-15 | 9-15 |
| Total RO | 6-9 | 1-15 | 1-15 | 6-15 | 1-9 | 6-9 | 1-15 | 1-15 |
| $R_2O$-RO | 0-6 | −4-6 | 0-6 | −4-8 | −4-8 | −4-8 | 0-8 | −4-6 |

| | 186 | 187 | 188 | 189 | 190 | 191 | 192 | 186 |
|---|---|---|---|---|---|---|---|---|
| $SiO_2$ | 70-75 | 70-75 | 70-75 | 70-75 | 70-75 | 70-75 | 70-75 | 70-75 |
| $Al_2O_3$ | 8-11 | 8-11 | 8-11 | 8-11 | 8-11 | 8-11 | 8-11 | 8-11 |
| $B_2O_3$ | 0.5-1 | 0.5-1 | 0.5-1 | 0.5-1 | 0.5-1 | 0.5-1 | 0.5-1 | 0.5-1 |
| $Na_2O$ | 5-11.5 | 5-11.5 | 5-11.5 | 5-11.5 | 5-11.5 | 5-11.5 | 5-11.5 | 5-11.5 |
| MgO | 0.5-5 | 0.5-5 | 0.5-5 | 0.5-5 | 0.5-5 | 0.5-5 | 0.5-5 | 0.5-5 |
| CaO | 3-5 | 3-5 | 3-5 | 3-5 | 3-5 | 3-5 | 3-5 | 3-5 |
| SrO | 0.5-3 | 0.5-3 | 0.5-3 | 0.5-3 | 0.5-3 | 0.5-3 | 0.5-3 | 0.5-3 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total $R_2O$ | 9-15 | 9-15 | 9-15 | 9-15 | 9-15 | 9-15 | 9-15 | 9-15 |
| Total RO | 6-15 | 6-15 | 6-15 | 1-9 | 1-9 | 1-9 | 6-9 | 6-15 |
| $R_2O$-RO | 0-8 | −4-6 | 0-6 | 0-8 | −4-6 | 0-6 | 0-8 | 0-8 |

| | 193 | 194 | 195 | 196 | 197 | 198 | 199 | 200 |
|---|---|---|---|---|---|---|---|---|
| $SiO_2$ | 70-75 | 70-75 | 70-75 | 70-75 | 70-75 | 70-75 | 70-75 | 70-75 |
| $Al_2O_3$ | 8-11 | 8-11 | 8-11 | 8-11 | 8-11 | 8-11 | 8-11 | 8-11 |
| $B_2O_3$ | 0.5-1 | 0.5-1 | 0.5-1 | 0.5-1 | 0.5-1 | 0.5-1 | 0.5-1 | 0.5-1 |
| $Na_2O$ | 5-11.5 | 5-11.5 | 5-11.5 | 5-11.5 | 5-11.5 | 5-11.5 | 5-11.5 | 5-11.5 |
| MgO | 0.5-5 | 0.5-5 | 0.5-5 | 0.5-5 | 0.5-5 | 0.5-5 | 0.5-5 | 0.5-5 |
| CaO | 3-5 | 3-5 | 3-5 | 3-5 | 3-5 | 3-5 | 3-5 | 3-5 |
| SrO | 0.5-3 | 0.5-3 | 0.5-3 | 0.5-3 | 0.5-3 | 0.5-3 | 0.5-3 | 0.5-3 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total $R_2O$ | 9-15 | 9-15 | 7-12 | 7-12 | 7-12 | 7-12 | 7-12 | 7-12 |
| Total RO | 6-9 | 6-9 | 6-15 | 6-15 | 6-15 | 1-9 | 1-9 | 1-9 |
| $R_2O$-RO | −4-6 | 0-6 | 0-8 | −4-6 | 0-6 | 0-8 | −4-6 | 0-6 |

| | 201 | 202 | 203 | 204 | 205 | 206 | 207 | 208 |
|---|---|---|---|---|---|---|---|---|
| $SiO_2$ | 70-75 | 70-75 | 70-75 | 70-75 | 70-75 | 70-75 | 70-75 | 70-75 |
| $Al_2O_3$ | 8-11 | 8-11 | 8-11 | 8-11 | 8-11 | 8-11 | 8-11 | 8-11 |
| $B_2O_3$ | 0.5-1 | 0.5-1 | 0.5-1 | 0.5-1 | 0.5-1 | 0.5-1 | 0.5-1 | 0.5-1 |
| $Na_2O$ | 5-11.5 | 5-11.5 | 5-11.5 | 5-11.5 | 5-11.5 | 5-11.5 | 5-11.5 | 5-11.5 |
| MgO | 0.5-5 | 0.5-5 | 0.5-5 | 0.5-5 | 0.5-5 | 0.5-5 | 0.5-5 | 0.5-5 |
| CaO | 3-5 | 3-5 | 3-5 | 3-5 | 3-5 | 3-5 | 3-5 | 3-5 |
| SrO | 0.5-3 | 0.5-3 | 0.5-3 | 0.5-3 | 0.5-3 | 0.5-3 | 0.5-3 | 0.5-3 |
| BaO | 0-3 | 0-3 | 0-3 | 0-3 | 0-3 | 0-3 | 0-3 | 0-3 |
| ZnO | 0-3 | 0-3 | 0-3 | 0-3 | 0-3 | 0-3 | 0-3 | 0-3 |
| Total $R_2O$ | 7-12 | 7-12 | 7-12 | 9-12 | 9-12 | 9-12 | 9-12 | 9-12 |
| Total RO | 6-9 | 6-9 | 6-9 | 6-15 | 6-15 | 6-15 | 1-9 | 1-9 |
| $R_2O$-RO | 0-8 | −4-6 | 0-6 | 0-8 | −4-6 | 0-6 | 0-8 | −4-6 |

TABLE 2-continued

|  | 209 | 210 | 211 | 212 |
|---|---|---|---|---|
| $SiO_2$ | 70-75 | 70-75 | 70-75 | 70-75 |
| $Al_2O_3$ | 8-11 | 8-11 | 8-11 | 8-11 |
| $B_2O_3$ | 0.5-1 | 0.5-1 | 0.5-1 | 0.5-1 |
| $Na_2O$ | 5-11.5 | 5-11.5 | 5-11.5 | 5-11.5 |
| MgO | 0.5-5 | 0.5-5 | 0.5-5 | 0.5-5 |
| CaO | 3-5 | 3-5 | 3-5 | 3-5 |
| SrO | 0.5-3 | 0.5-3 | 0.5-3 | 0.5-3 |
| BaO | 0-3 | 0-3 | 0-3 | 0-3 |
| ZnO | 0-3 | 0-3 | 0-3 | 0-3 |
| Total $R_2O$ | 9-12 | 9-12 | 9-12 | 9-12 |
| Total RO | 1-9 | 6-9 | 6-9 | 6-9 |
| $R_2O$-RO | 0-6 | 0-8 | -4-6 | 0-6 |

In some embodiments, the glasses described herein can be manufactured into sheets via a downdraw or fusion process, as described in U.S. Pat. Nos. 3,338,696 and 3,682,609, both of which are incorporated by reference in their entireties. The fusion draw process uses an isopipe that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the isopipe. These outside surfaces extend down and inwardly so that they join at an edge below the drawing tank. The two flowing glass surfaces join at this edge to fuse and form a single flowing sheet. The fusion draw method offers the advantage that, since the two glass films flowing over the channel fuse together, neither outside surface of the resulting glass sheet comes in contact with any part of the apparatus. Thus, the surface properties are not affected by such contact.

The fusion draw process results in a pristine, fire-polished glass surface that reduces surface-mediated distortion in glass sheets used for superstrates or substrates. Compared to other forming processes, such as the float process, the fusion process offers several advantages. First, glass substrates made from the fusion process do not require polishing. Current glass substrate polishing is capable of producing glass substrates having an average surface roughness greater than about 0.5 nm (Ra), as measured by atomic force microscopy. The glass substrates produced by the fusion process have an average surface roughness as measured by atomic force microscopy of less than 0.5 nm. The substrates also have an average internal stress as measured by optical retardation which is less than or equal to 150 psi.

While the glass is compatible with the fusion process, it may also be manufactured into sheets or other shapes through less demanding manufacturing processes, such as slot draw, float, rolling, and other sheet-forming processes known to those skilled in the art. Alternatively, glass compositions may be formed via float or rolling processes known in the art. For example, in some embodiments, a slot draw process can be used. The slot draw method is distinct from the fusion draw method. Here the molten raw material glass is provided to a conduit. The bottom of the conduit has an open slot that is wider in one dimension than the other dimension with a nozzle that extends the length of the slot. The molten glass flows through the slot/nozzle and is drawn downward as a continuous sheet there through and into an annealing region. Compared to the fusion draw process, the slot draw process provides a thinner sheet, as only a single sheet is drawn through the slot, rather than two sheets being fused together, as in the fusion down-draw process.

Relative to these alternative methods for creating sheets of glass, the fusion process as discussed above is capable of creating very thin, very flat, very uniform sheets with a pristine surface. Slot draw also can result in a pristine surface, but due to change in orifice shape over time, accumulation of volatile debris at the orifice-glass interface, and the challenge of creating an orifice to deliver truly flat glass, the dimensional uniformity and surface quality of slot-drawn glass are generally inferior to fusion-drawn glass. The float process is capable of delivering very large, uniform sheets, but the surface is substantially compromised by contact with the float bath on one side, and by exposure to condensation products from the float bath on the other side.

To be compatible with down-draw processes, the glass compositions described herein can have high liquidus viscosity. In some embodiments, the glass composition can have a liquidus viscosity of from about 100 kP to about 3 MP. In some embodiments, the glass composition can have a liquidus viscosity of 100, 200, 300, 400, 500, 600, 700, 800, 900, 1000, 1200, 1500, 2000, 2500, 3000 kP. In some embodiments, the glass composition can have a liquidus viscosity of about 100 kP or greater, about 110 kP or greater, about 120 kP or greater, about 130 kP or greater, about 140 kP or greater, about 150 kP or greater, about 160 kP or greater, about 170 kP or greater, about 180 kP or greater, about 200 kP or greater, about 225 kP or greater, about 250 kP or greater, about 300 kP or greater, about 350 kP or greater, about 400 kP or greater, about 450 kP or greater, about 500 kP or greater, about 750 kP or greater, about 1 MP or greater, or about 2 MP or greater.

In some embodiments, the glass composition can have a strain point of about 540° C. or greater, about 550° C. or greater, about 560° C. or greater, about 570° C. or greater, about 580° C. or greater, about 590° C. or greater, about 600° C. or greater, about 610° C. or greater, about 620° C. or greater, or about 630° C. or greater.

In some embodiments, the glass can have a coefficient of thermal expansion of about $60 \times 10^{-7}$ or greater, about $61 \times 10^{-7}$ or greater, about $62 \times 10^{-7}$ or greater, about $63 \times 10^{-7}$ or greater, about $64 \times 10^{-7}$ or greater, about $65 \times 10^{-7}$ or greater, about $66 \times 10^{-7}$ or greater, about $67 \times 10^{-7}$ or greater, about $68 \times 10^{-7}$ or greater, about $69 \times 10^{-7}$ or greater, about $70 \times 10^{-7}$ or greater, about $71 \times 10^{-7}$ or greater, about $72 \times 10^{-7}$ or greater, about $73 \times 10^{-7}$ or greater, about $74 \times 10^{-7}$ or greater, about $75 \times 10^{-7}$ or greater, about $76 \times 10^{-7}$ or greater, about $77 \times 10^{-7}$ or greater, about $78 \times 10^{-7}$ or greater, about $79 \times 10^{-7}$ or greater, or about $80 \times 10^{-7}$ or greater.

In some embodiments, the glass sheets can be characterized as having strain points ≥565° C., thermal expansion coefficient of from 6.5 to 10.5 ppm/T, as well as having liquidus viscosities in excess of 100,000 poise. As such they are ideally suited for being formed into sheet by the fusion process.

The glass sheets used in the outer protective layers can be any thickness that is reasonably useful for embodiments described. However, it is often ideal to make the PV modules as light as possible while still retaining structural rigidity. Additionally, use of thinner glass results in less light loss in the material. Any suitable glass thickness can be used. Glass sheet embodiments may have a thickness of about 4 mm or less, about 3 mm or less, about 2.9 mm or less, about 2.8 mm or less, about 2.7 mm or less, about 2.6 mm or less, about 2.5 mm or less, about 2.4 mm or less, about 2.3 mm or less, about 2.2 mm or less, about 2.1 mm or less, about 2.0 mm or less, about 1.9 mm or less, about 1.8 mm or less, about 1.7 mm or less, about 1.6 mm or less, about 1.5 mm or less, about 1.4 mm or less, about 1.3 mm or less, about 1.2 mm or less, about 1.1 mm or less, about 1.0 mm or less, 0.9 mm or less, 0.8 mm or less, 0.7 mm or less, 0.6 mm or less, 0.5 mm or less, 0.4 mm or less, 0.3 mm or less, 0.2 mm or less, 0.1 mm or less, about 900 $\mu$m or less, about 800 $\mu$m or less, about 700 $\mu$m or less, about 600 $\mu$m or less, about 500 $\mu$m or less, about 400 $\mu$m or less, about 300 $\mu$m or less, about 200 $\mu$m or less, about 100 $\mu$m or less, about 90 $\mu$m or less, about 80 $\mu$m or less, about 70 $\mu$m or less, about 80 $\mu$m or less, about 70 $\mu$m or less, about 60 $\mu$m or less, or about 50 $\mu$m or less. Some glass sheet embodiments may have thickness of from about 200 $\mu$m to about 3 mm, about 500 $\mu$m to about 3 mm, about 200 $\mu$m to about 2 mm, about 200 $\mu$m to about 1 mm, about 400 $\mu$m to about 2.5 mm, about 400 $\mu$m to about 2 mm, about 400 $\mu$m to about 1 mm, about 600 $\mu$m to about 1.5 mm, about 3 mm to about 1 mm, 2.5 mm to about 1 mm, 2.0 mm to about 1.0 mm, 2.0 mm to about 1.5 mm, about 1.2 mm to about 3.5 mm, about 1.5 mm to about 3.5 mm, about 1.5 mm to about 3.0 mm, about 1.5 mm to about 2.5 mm, or about 1.5 mm to about 2.0 mm.

β-OH, as used herein, is a measure of the hydroxyl content in the glass as measured by infrared spectroscopy, and is determined using the fundamental hydroxyl absorption for the glass. (U.S. Pat. No. 6,128,924, herein incorporated by reference in its entirety). β-OH is one way of measuring the water content in the glass. Water content can play a role in glass composition characteristics as well as possibly influencing device performance. In some embodiments, the glass composition comprises a β-OH value of from 0.1 to about 1, 0.1 to 0.9, 0.1 to 0.8, 0.1 to 0.7, 0.1 to 0.6, 0.1 to 0.5, 0.1 to 0.4, 0.1 to 0.3, 0.1 to 0.2, 0.2 to 0.10, 0.2 to 0.9, 0.2 to 0.8, 0.2 to 0.7, 0.2 to 0.6, 0.2 to 0.5, 0.2 to 0.4, 0.2 to 0.3, 0.3 to about 1, 0.3 to 0.9, 0.3 to 0.8, 0.3 to 0.7, 0.3 to 0.6, 0.3 to 0.5, 0.3 to 0.4, 0.4 to about 1, 0.4 to 0.9, 0.4 to 0.8, 0.4 to 0.7, 0.4 to 0.6, 0.4 to 0.5, 0.5 to about 1, 0.5 to 0.9, 0.5 to 0.5, 0.5 to 0.7, 0.5 to 0.6, 0.6 to about 1, 0.6 to 0.9, 0.6 to 0.8, 0.6 to 0.7, 0.7 to about 1, 0.7 to 0.9, 0.7 to 0.8, 0.8 to about 1, 0.8 to 0.9, or 0.9 to about 1. In some embodiments, the β-OH value is 0.1, 0.2, 0.3, 0.4, 0.5, 0.6, 0.7, 0.8, 0.9, or 1.

In addition, all of the compositions are ion exchangeable by those methods widely known in the art. In the ion exchange process, smaller metal ions in the glass are replaced or "exchanged" by larger metal ions of the same valence within a layer that is close to the outer surface of the glass. The replacement of smaller ions with larger ions creates a compressive stress within the layer. In one embodiment, the metal ions are monovalent alkali metal ions (e.g., Na$^+$, K$^+$, Rb$^+$, and the like), and ion exchange is accomplished by immersing the glass in a bath comprising at least one molten salt of the larger metal ion that is to replace the smaller metal ion in the glass. Alternatively, other monovalent ions such as Ag$^+$, Tl$^+$, Cu$^+$, and the like may be exchanged for monovalent ions. The ion exchange process or processes that are used to strengthen the glass can include, but are not limited to, immersion in a single bath or multiple baths of like or different compositions with washing and/or annealing steps between immersions. For example, embodiments may be ion exchanged by exposure to molten KNO$_3$ at a temperature of 410° C. for 8 hours to produce a compressive stress layer having a depth (also referred to as a "depth of layer") of at least 20 $\mu$m on the surface of the glass and a maximum compressive stress of at least 350 MPa. In other embodiments the glasses are ion exchanged to achieve a central tension of at least 10 MPa.

The terms "solar cell," "photovoltaic cell," "PV cell," "solar module," "photovoltaic module," "PV module," "solar device," "photovoltaic device," "PV device," or "device," as used herein, refer to any article that can convert light into electrical energy. Suitable solar cells include thin-film solar cells, such as CIGS, CdTe, CdS, amorphous or thin-film Si, dye-sensitized solar, etc. A solar cell assembly can comprise one or a plurality of solar cells. The plurality of solar cells can be electrically interconnected or arranged in a flat plane. In addition, the solar cell assembly can further comprise conductive pastes or electrical wirings deposited upon the solar cells.

The outer protective layers comprise at least one glass sheet and may optionally further comprise polymer, metal or metallic sheets along with organic, or inorganic coatings, surface modifications, or other modifications to make them suitable for use in photovoltaic applications. Other modifications can include edge preparations, holes or slots for edge sealing, junction boxes, brackets or framing, etc.

Embodiments of the photovoltaic module may further comprise sealants, encapsulants, fillers, drying agents, ultraviolet radiation absorbers, and other materials. In some embodiments, the PV module may further comprise polymeric materials that may act as sealants, encapsulants, fillers, ultraviolet radiation absorbers, and other materials. In some of these embodiments, the polymers acting to prevent moisture ingress are below their glass transition temperature at all temperatures that the PV module will be exposed to. In some embodiments, the glass transition temperature of the polymeric materials comprising the encapsulant, sealant, or filler can have a glass transition temperature of greater than 60° C., 65° C., 70° C., 75° C., 80° C., 85° C., 90° C., or 95° C. Some of the polymers used in PV modules can degrade forming products that can be potentially harmful to the device, such as, for example, poly(ethylene vinyl acetate) that can degrade in the presence of water into acetic acid. In some embodiments, the polymers used can comprise materials decrease thermal or UV radiation-induced degradation into caustic or other materials that could be harmful to the device.

Embodiments can comprise encapsulants, such as, for example, copolymers, poly(ethylene vinyl acetates) (EVA), poly(vinyl acetals) (e.g., poly(vinyl butyrals) (PVB)), polyurethanes, poly(vinyl chlorides), polyethylenes (e.g., linear low density polyethylenes), polyolefin block copolymer elastomers, copolymers of □-olefins and □□□-ethylenically unsaturated carboxylic acid esters) (e.g., ethylene methyl acrylate copolymers and ethylene butyl acrylate copolymers), silicone elastomers, epoxy resins, and combinations of two or more of these polymeric materials, and ionomers, such as DuPont's® PV5400, PV5300, PV5200, or PV8600. Embodiments also can comprise sealing materials to decrease or prevent moisture ingress, such as a butyl sealant or silicone sealant, at the module perimeter or junction box. Embodiments also can comprise adhesives or glues, such as epoxy or silicone, which may be applied in a liquid, paste, or solid form, such as a roll or tape.

In some embodiments, a functional layer can be disposed on the glass substrate of the first outer protection layer. The functional layer can be selected from an anti-glare layer, an anti-smudge layer, a self-cleaning layer, an anti-reflection layer, an anti-fingerprint layer, an ultra-violet protection layer, an optically scattering layer, and combinations thereof.

In some embodiments, one or more additional glass sheets can be incorporated into the PV module on the side of one of the outer protective layers opposite the solar cell wafer. The additional sheet is useful as structural components and may or may not have sodium in its composition. The additional glass sheet can have a thickness sufficient to add structural stability to the device. In some embodiments, the additional glass sheet can have a thickness from about 1.2 mm to about 3.5 mm, about 1.5 mm to about 3.5 mm, about 1.5 mm to about 3.0 mm, about 1.5 mm to about 2.5 mm, or about 1.5 mm to about 2.0 mm. In some embodiments, the additional glass sheet can have a thickness of about 1.5 mm, about 1.6 mm, about 1.7 mm, about 1.8 mm, about 1.9 mm about, 2.0 mm, about 2.1 mm, about 2.2 mm, about 2.3 mm, about 2.4 mm, about 2.5 mm, about 2.6 mm, about 2.7 mm, about 2.8 mm, about 2.9 mm, about 3.0 mm, about 3.1 mm, about 3.2 mm, about 3.3 mm, about 3.4 mm, or about 3.5 mm.

The invention claimed is:

1. A glass comprising, in mol %:
65-80 $SiO_2$
3-13 $Al_2O_3$
0-5.5 $B_2O_3$
>0-10 MgO
0-10 CaO
0-10 SrO
1-9 $Na_2O$;
>0 and <3.5 $K_2O$;
and 1≤R'O≤15, wherein R'O=MgO+CaO+SrO+BaO.

2. The glass of claim 1, wherein and 2≤$R_2O$≤13.1, wherein $R_2O$=$K_2O$+$Na_2O$.

3. The glass of claim 2, wherein the glass comprises in mol %:
70-77 $SiO_2$
4.5-10.5 $Al_2O_3$
>0-5 $B_2O_3$
3-5 MgO
>0-5 CaO
0-5 SrO
and wherein 2.3≤$R_2O$≤13.1 and 4.5≤R'O≤12.

4. The glass of claim 1, wherein the glass comprises in mol %:
65-80 $SiO_2$
3-13 $Al_2O_3$
0-5 $B_2O_3$
2-7 MgO
>0-7 CaO
0-6 SrO.

5. The electronic device comprising the glass of claim 1.

6. The electronic device of claim 5, wherein the device comprises a photovoltaic module.

7. The glass of claim 1, wherein the glass has a Na release greater than 10 ppm in a buffered aqueous release test and a total Na+K release of less than 50 ppm in a buffered aqueous release test.

8. The glass of claim 7, wherein the glass has a $T^{margin}$=$T^{breakdown}$-$T^{35kp}$>10° C.

9. The glass of claim 7, wherein the Na+K release is less than 30 ppm.

10. The glass of claim 7, wherein the glass has a coefficient of thermal expansion greater than 6 ppm/° C.

11. The glass of claim 7, wherein the glass has a strain point greater than 565° C.

12. The glass of claim 11, wherein the glass has a strain point greater than 585° C.

13. The glass of claim 7, wherein the glass has a liquidus viscosity greater than 130 kP.

14. An electronic device comprising the glass of claim 7.

15. The electronic device of claim 14, wherein the device comprises a photovoltaic module.

16. A glass comprising, in mol %:
70-77 $SiO_2$
4.5-10.5 $Al_2O_3$
>0-5 $B_2O_3$
3-5 MgO
>0-5 CaO
>0-5 SrO
1.8-9 $Na_2O$
between 0 and 3.5 $K_2O$
wherein 2.3≤$R_2O$≤13.1 and 4.5≤R'O≤12, and the glass has a Na release greater than 10 ppm in a buffered aqueous release test and a total Na+K release of less than 30 ppm in a buffered aqueous release test, a $T^{margin}$=$T^{breakdown}$-$T^{35kp}$>10° C., a coefficient of thermal expansion greater than 6 ppm/° C., and a strain point greater than 565° C.

17. The glass of claim 16, wherein the glass has a liquidus viscosity of greater than 130 kP.

* * * * *

UNITED STATES PATENT AND TRADEMARK OFFICE
CERTIFICATE OF CORRECTION

PATENT NO. : 10,407,338 B2  
APPLICATION NO. : 15/616113  
DATED : September 10, 2019  
INVENTOR(S) : Bruce Gardiner Aitken et al.

Page 1 of 1

It is certified that error appears in the above-identified patent and that said Letters Patent is hereby corrected as shown below:

On the Title Page

Item (56), other publications, Line 9, delete "Pagesl" and insert -- Pages --, therefor.

Signed and Sealed this
Twenty-fifth Day of February, 2020

Andrei Iancu
*Director of the United States Patent and Trademark Office*